(12) United States Patent
Bunya et al.

(10) Patent No.: US 8,153,879 B2
(45) Date of Patent: Apr. 10, 2012

(54) DATA PROCESSING APPARATUS, DATA REPRODUCTION APPARATUS, DATA PROCESSING METHOD AND DATA PROCESSING PROGRAM

(75) Inventors: Takashi Bunya, Kanagawa (JP); Hiroshi Ito, Kanagawa (JP); Shin Ogiso, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/401,760

(22) Filed: Apr. 11, 2006

(65) Prior Publication Data

US 2006/0251386 A1 Nov. 9, 2006

(30) Foreign Application Priority Data

Apr. 15, 2005 (JP) ................................. 2005-118681

(51) Int. Cl.
*G10H 1/40* (2006.01)
(52) U.S. Cl. ........................................................ 84/612
(58) Field of Classification Search .................... 84/465, 84/612; 482/3, 8, 9
See application file for complete search history.

(56) References Cited

U.S. PATENT DOCUMENTS

| 5,215,468 A | * | 6/1993 | Lauffer et al. | 434/236 |
| 5,267,942 A | * | 12/1993 | Saperston | 600/28 |
| 2006/0107822 A1 | * | 5/2006 | Bowen | 84/612 |

FOREIGN PATENT DOCUMENTS

| EP | 1251441 A2 | * | 10/2002 |
| JP | 04-013195 | | 1/1992 |
| JP | 2000-099097 A | | 4/2000 |
| JP | 2001-299980 | | 10/2001 |
| JP | 2002-055993 A | | 2/2002 |
| JP | 2003-015666 A | | 1/2003 |
| WO | WO 03/083824 A2 | | 10/2003 |

\* cited by examiner

*Primary Examiner* — Elvin G Enad
*Assistant Examiner* — Andrew R Millikin
(74) *Attorney, Agent, or Firm* — Wolf, Greenfield & Sacks, P.C.

(57) ABSTRACT

A reproduction list PL1 and specified BPMs of pieces of music that are to be used to control the operation of replaying the pieces of music are prepared on the basis of their ordinary BPMs that indicate the tempos specified in advance for the respective pieces of music (and hence the reproduction speeds specified in advance by the audio data of the respective pieces of music) so that it is now possible to prepare with ease a reproduction list PL1 for replaying only pieces of music having the same tempo or specified BPMs for changing the tempo of each of the pieces of music to a desired one, according to the tempo of a piece of music. Thus, it is also possible to replay with ease each of the pieces of music with a desired tempo (or a reproduction speed) according to the reproduction list PL1 and the specified BPMs.

14 Claims, 21 Drawing Sheets

| FILE NAME | MUSIC TITLE | ARTIST NAME | ORDINARY BPM | GENRE | ALBUM TITLE | TRACK NUMBER | ... |
|---|---|---|---|---|---|---|---|
| F001 | EVER | GLEY | 100 | JPOP | OTHER WORLD | 01 | ... |
| F002 | ALWAYS IN THREE | GLEY | 60 | JPOP | OTHER WORLD | 02 | ... |
| F003 | MISSING THEM | GLEY | 120 | JPOP | OTHER WORLD | 03 | ... |
| F004 | TODAY NEVER KNOWS | MR.BOYS | 110 | JPOP | FOUND | 01 | ... |
| F005 | DREAM THAT NEVER ENDS | MR.BOYS | 150 | JPOP | FOUND | 02 | ... |
| ... | ... | ... | ... | ... | ... | ... | ... |

| SEQUENCE OF PIECES OF MUSIC | SPECIFIED BPM |
|---|---|
| 1 | 100 |
| 2 | 115 |
| 3 | 130 |

DATA PROCESSING APPARATUS, DATA REPRODUCTION APPARATUS, DATA PROCESSING METHOD AND DATA PROCESSING PROGRAM

CROSS REFERENCES TO RELATED APPLCATIONS

The present invention contains subject matter related to Japanese Patent Application 2005-118681, filed in the Japanese Patent Office on Apr. 15, 2005, the entire contents of which being incorporated herein by reference.

BACKGROUND OF THE INVENTION

1. Field of the Invention

This invention relates to a data processing apparatus that can suitably be used, for example, for preparing reproduction control information for the purpose of controlling the reproduction of audio data.

2. Description of the Related Art

Sports for moving human bodies according to the tempo of a piece of music such as dance and aerobics have been very popular in recent years. When playing such sports, many people not only move their bodies according to the tempo of the piece of music being sounded but also select a piece of music whose tempo matches the body motions they can do.

However, when they cannot find out a piece of music whose tempo matches the body motions they can do, they may be required to change the tempo of the piece of music so as to make it match their body motions.

Actually, there have been proposed reproduction apparatus having a functional feature (a device referred to as digital pitch controller) of changing the tempo of a piece of music by controlling and multiplying the speed of reproducing the audio data that corresponds to the piece of music being replayed by given number of times so as to change the tempo of the piece of music without changing the pitches of the piece of music when the fast forward button of the apparatus is depressed (see, for example, Jpn. Pat. Appln. Laid-Open Publication No. 2000-099097).

SUMMARY OF THE INVENTION

However, such reproduction apparatus only control and multiply the speed of reproducing the audio data that corresponds to the piece of music being replayed by given number of times so as to change the tempo of the piece of music. In other words, they can change neither the tempo of a piece of music to a desired tempo whenever required nor collectively the tempos of a plurality of pieces of music.

Therefore, a person who wants to use the piece of music for sports has to prepare a music CD by editing the original piece of music so as to make the tempo of the piece of music matches his or her body motions with a permission of the person or persons who have copyright on the piece of music.

In short, there have been situations where any desired piece of music cannot be replayed with a desired tempo with ease. In other words, there have been situations where data cannot be reproduced at a desired reproduction speed by means of a reproduction apparatus.

In view of the above-identified problem, it is therefore an object of the present invention to provide a data processing apparatus, a data reproduction apparatus, a data processing method and a data processing program that can reproduce data at a desired reproduction speed with ease.

In an aspect of the present invention, the above objects are achieved by providing a data processing apparatus including: a memory section for storing data the corresponding speed information indicating a first reproduction speed at which the data is to be reproduced in association with each other; and a reproduction control information generating section for generating reproduction control information for controlling the reproduction of the data according to the speed information corresponding to the data.

Thus, as reproduction control information for controlling the reproduction of given data is generated according to the speed information corresponding to the data, it is possible to generate reproduction control information according to the reproduction speed of the data such as reproduction control information for reproducing data only having the same reproduction speed, and reproduction control information for changing the reproduction speed of data to a desired reproduction speed with ease.

Thus, according to one embodiment of the present invention, as reproduction control information for controlling the reproduction of given data is generated according to the speed information defined for the data, it is possible to generate reproduction control information according to the reproduction speed of the data such as reproduction control information for reproducing data only having the same reproduction speed and reproduction control information for changing the reproduction speed of data to a desired reproduction speed with ease. Therefore, it is possible to realize a data processing apparatus, a data reproduction apparatus, a data processing method and a data processing program that can reproduce given data at a desired reproduction apparatus with ease on the basis of the reproduction control information.

The nature, principle and utility of the present invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 2 is a schematic illustration of a music-related information management table;

FIG. 16 is a schematic illustration of a replaying sequence BPM table;

DETAILED DESCRIPTION OF THE PREFERRED EMBODIMENTS

Now, the present invention will be described in greater detail by referring to the accompanying drawings that illustrate preferred embodiments of the present invention.

(1) First Embodiment (1-1) Configuration of Recording/Reproduction System

Figure 1:
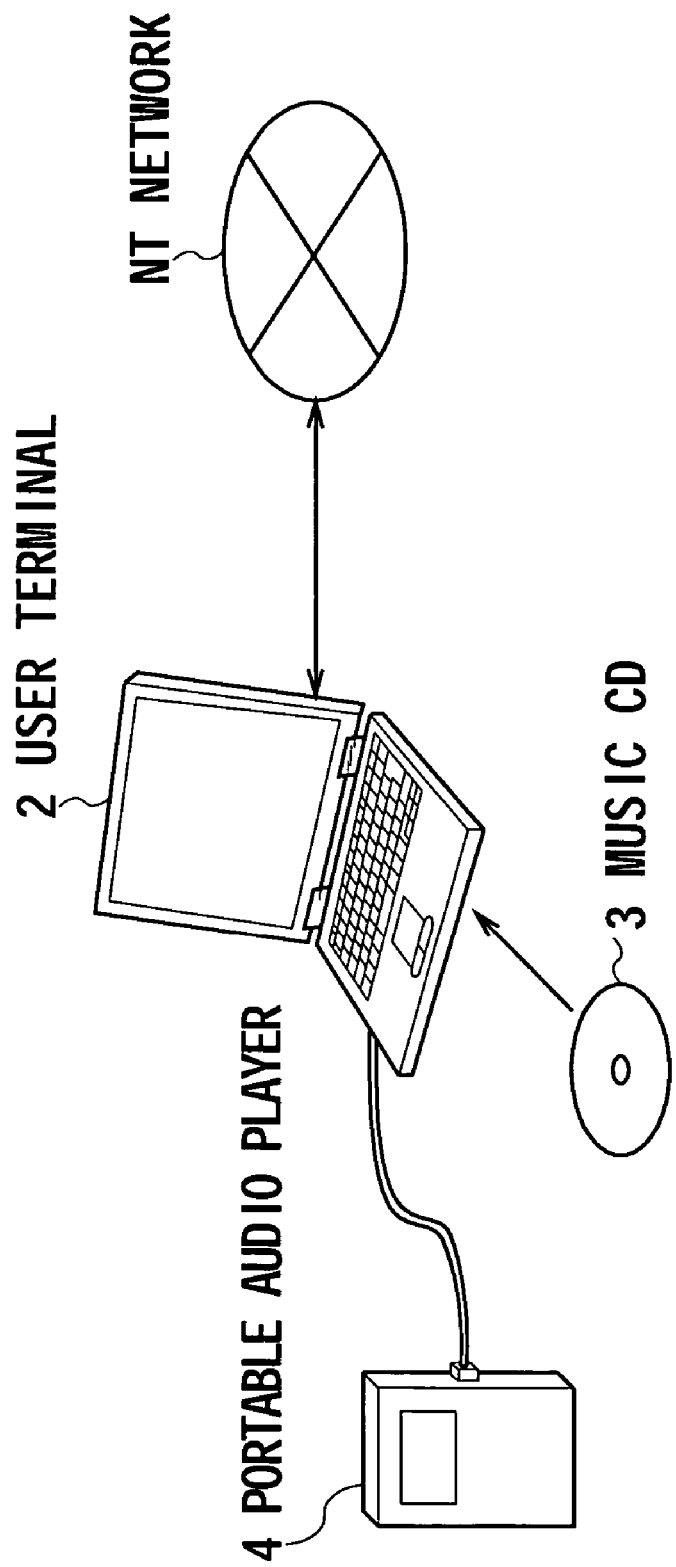
FIG. 1 is a schematic block diagram of a recording/reproduction system to which a first embodiment of the present invention can be applied.

FIG. 1 shows a recording/reproduction system 1 which records a piece of music as a content and reproduces a recorded piece of music. Referring to FIG. 1, as a music CD 3 is loaded in a terminal 2 of a user (to be also referred to as user terminal hereinafter), the user terminal 2 reads out the audio data of the pieces of music recorded on the music CD 3, compression-codes the audio data and stores it in its own hard disk drive. Thus, the pieces of music are recorded in the hard disk drive. Assume here that an audio data is the data of a piece of music (1 track) for the convenience of explanation.

When information on the each of the pieces of music including the title of the piece of music, the artists playing the piece of music, the speed of the piece of music, the genre of the piece of music, the title of the album where the piece of music is stored and the track number of the piece of music in the album is also recorded on the loaded music CD 3 (to be also referred to as music-related information hereinafter), the music-related information and the compression-coded audio data (to be also referred to as compressed audio data hereinafter) of each of the pieces of music are stored in the hard disk drive in association with each other.

The speed of a piece of music as used herein refers to the predefined tempo of the piece of music (in other words, the speed at which the piece of music is replayed as defined in the compressed audio data). It may typically show the tempo at which the pieces of music recorded on the CD 3 are ordinarily replayed by an ordinary CD player. The speed of a piece of music is also referred to as ordinary Beats Per Minute (BPM) hereinafter. As will be described hereinafter, the speed of a piece of music that the user freely defines by means of the portable audio player 4 of the system is referred to as specified BPM. Thus, the specified BPM refers to the tempo at which each piece of music is actually replayed by the portable audio player 4 of the system.

When, on the other hand, no music-related information is recorded on the loaded music CD 3, the user terminal acquires the music-related information on the pieces of music that are recorded on the music CD from a predetermined server (not shown) on the network NT that stores and manages music-related information and Table Of Contents (TOC) information on commercially available music CDs in association with each other by sending the TOC information of the music CD 3 and stores the acquired music-related information and the compression-coded audio data in the hard disk drive in association with each other.

Actually, the hard disk drive of the user terminal 2 generates a music-related information management table TB1 to be used for storing and managing the compressed audio data of each piece of music and the corresponding music-related information in association with each other as shown in FIG. 2. The music-related information management table TB1 includes a column "file name" for storing the file names of the compressed audio data stored in the hard disk drive, a column "music title" for storing the titles of the pieces of music obtained from the music CD 3 or the predetermined server on the network NT, a column "artist name" for storing the names of the performing artists, a column "ordinary BPM" for storing the ordinary BPM of each of the pieces of music, a column "genre" for storing the genre to which each of the pieces of music belongs, a column "albums title" for storing the titles of the albums of the pieces of music and a column "track No." for storing the track number of each of the pieces of music.

More specifically, the user terminal 2 stores the file name "F001" where the compressed audio data is stored, the music title "ever" obtained as music-related information, the artist name "GLEY", the ordinary BPM "100", the genre "J-pop", the album title "OTHER WORLD", the track number "01", . . . in the corresponding respective columns of the music-related information management table TB1 for compressed audio data it has stored. In this way, that it stores and manages the compressed audio data and music-related information for each piece of music in association with each other.

Then, whenever necessary, the user terminal 2 displays the music-related information stored in the music-related information management table TB1 on a predetermined display section to provide the user of the information relating to each recorded piece of music.

Additionally, the user terminal 2 sends all or part of the compressed audio data and the music-related information stored in the hard disk drive in a manner as described above to the portable audio player 4 connected to itself and writes them in the nonvolatile memory of the portable audio player 4.

The portable audio player 4 is an appliance dedicated to replaying music and adapted to reproduce the compressed audio data written to its own nonvolatile memory by the user terminal 2. Additionally, a music-related information management table TB2 having a column format same as that of the music-related information management table TB1 generated in the hard disk drive of the user terminal 2 is generated in the nonvolatile memory of the portable audio player 4 and the music-related information transmitted from the user terminal 2 is stored in the music-related information management table TB2 so that the compressed audio data and the music-related information transmitted from the user terminal 2 are recorded in the nonvolatile memory 21, stored there and managed in association with each other. Whenever necessary, the portable audio player 4 displays the music-related information stored in the music-related information management table TB2 on a predetermined display section.

In this way, the recording/reproduction system 1 reads out the audio data of each piece of music from a music CD 3; records and stores it in the hard disk drive of the user terminal 2 as compressed audio data; transmits the compressed audio data it stores to the portable audio player 4; and reproduces it at the portable audio player 4. Additionally, the recording/reproduction system 1 acquires the music-related information for the pieces of music it recorded in the user terminal 2 from the music CD 3 or a predetermined server on the network NT and stores and manages it in association with the compressed audio data of the pieces of music.

With this arrangement, the user can store each piece of music recorded on the music CD 3 in the nonvolatile memory of the portable audio player 4 and listen to it. Additionally, the user can check the information relating to the piece of music at the user terminal 2 or the portable audio player 4.

In addition to the basic recording/reproduction features, the recording/reproduction system 1 to which the present invention can be applied has a reproduction list preparation feature of preparing a reproduction list of pieces of music by utilizing the ordinary BPMs obtained as music-related information and a reproduction speed control feature of controlling the reproduction speed of each of the compressed audio data that correspond to the pieces of music by utilizing the ordinary BPMs. Now, the reproduction list preparation feature and the reproduction speed control feature will be described below along with the internal configuration of the user terminal 2 and that of the portable audio player 4.

(1-2) Reproduction List Preparation Feature, Reproduction Speed Control Feature, Configuration of User Terminal and that of Portable Audio Player Firstly, how a reproduction list is prepared by the reproduction list preparation feature will be summarily described below. Such a reproduction list is a list that shows the file names of the compressed audio data to be reproduced by the portable audio player 4 and the sequence of reproduction of the compressed audio data out of the compressed audio data stored in the user terminal 2. It is prepared by the user terminal 2 and transmitted to the portable audio player 4 along with the compressed audio data and the music-related information that correspond to the reproduction list.

Figure 3:
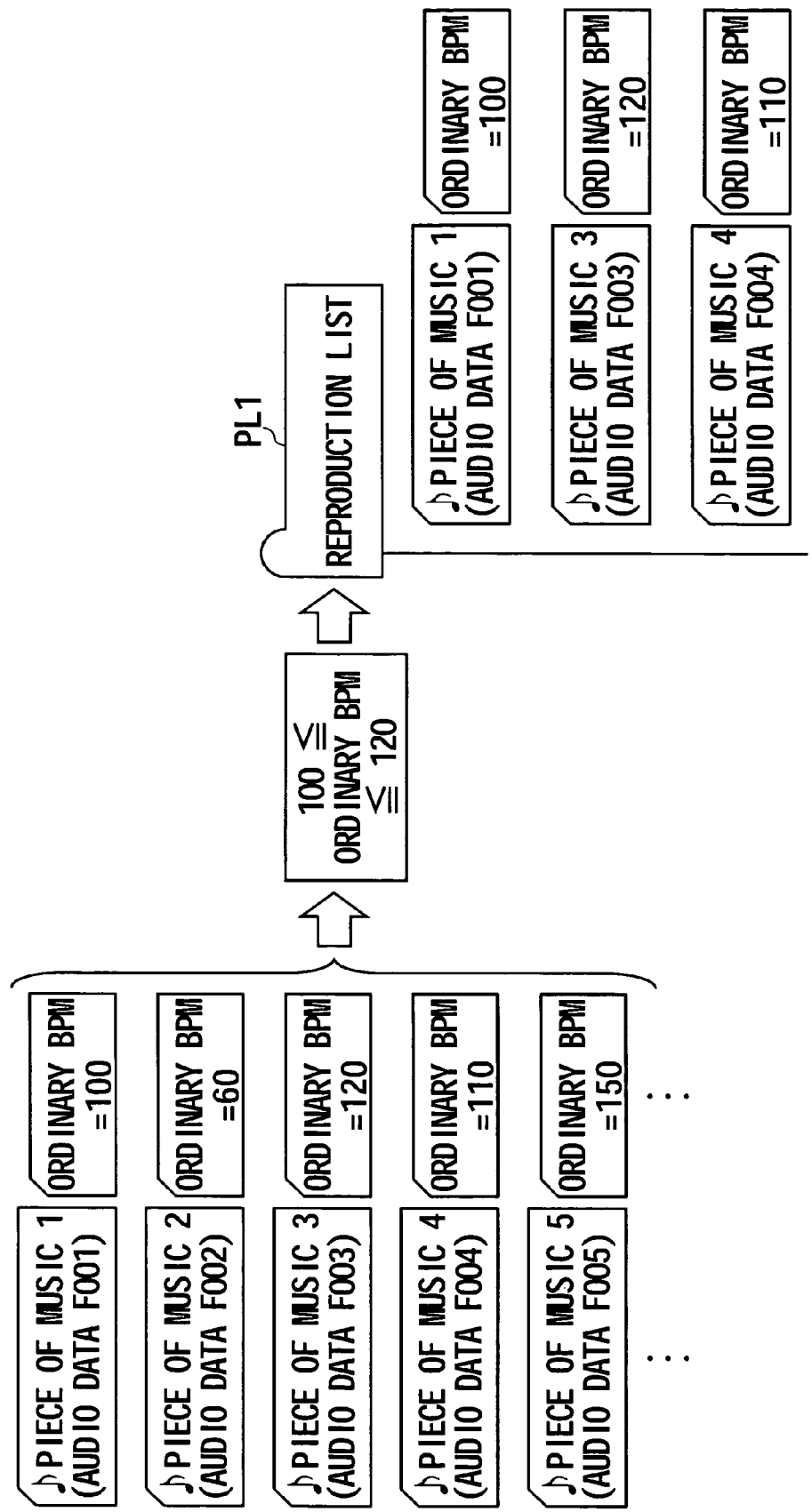
FIG. 3 is a schematic illustration of preparation of a reproduction list.

Thus, the user terminal 2 selects, for instance, the compressed audio data whose ordinary BPMs are found within a predetermined range out of the compressed audio data stored in the hard disk drive and generates a reproduction list for reproducing the selected compressed audio data in a predetermined sequence. More specifically, as shown in FIG. 3, the user terminal 2 prepares reproduction list PL1 for reproducing the compressed audio data "F001" (ordinary BPM=100), "F003" (ordinary BPM=120) and "F004" (ordinary BPM=110) whose ordinary BPMs are found within a range not lower than "100" and not higher than "120" in the sequence specified by the user. The range of ordinary BPMs may be directly input by the user or several different ranges may be stored in the user terminal 2 and the user may be prompted to select one of them.

As the user terminal 2 prepares the reproduction list PL1, utilizing ordinary BPMs, it is possible to prepare the reproduction list PL1 where the titles of pieces of music of a substantially same tempo are put together. Then, the portable audio player 4 can replay the corresponding pieces of music at the substantially same tempo according to the reproduction list PL1.

Now, the reproduction speed control feature for controlling the reproduction speed will be summarily described below. The portable audio player 4 of this system is adapted to control the reproduction speed of each compressed audio data that corresponds to a piece of music according to the ratio of the specified BPM showing a value arbitrarily specified by the user to the ordinary BPM obtained as music-related information.

More specifically, for example, when the value of the ordinary BPM of compressed audio data to be reproduced is "100" and the value of the specified BPM specified in advance by the user is equal to the value of the ordinary BPM, or "100", the portable audio player 4 reproduces the compressed audio data at a speed equal to the ordinary reproduction speed (100/100) so that the portable audio player 4 may replay the corresponding piece of music at a tempo same as the tempo of the piece of music when it is replayed ordinarily. When, on the other hand, the value of the specified BPM of the compressed audio data to be reproduced is "50", the portable audio player 4 reproduces the compressed audio data at a speed equal to ½ times of the ordinary reproduction speed (50/100) so that the portable audio player 4 may replay the corresponding piece of music at a tempo that is ½ times of the tempo of the piece of music when it is replayed ordinarily. Furthermore, When the value of the specified BPM of the compressed audio data to be reproduced is "200", the portable audio player 4 reproduces the compressed audio data at a speed equal to 2 times of the ordinary reproduction speed (200/100) so that the portable audio player 4 may replay the corresponding piece of music at a time that is 2 times of the tempo of the piece of music when it is replayed ordinarily.

Figure 4:
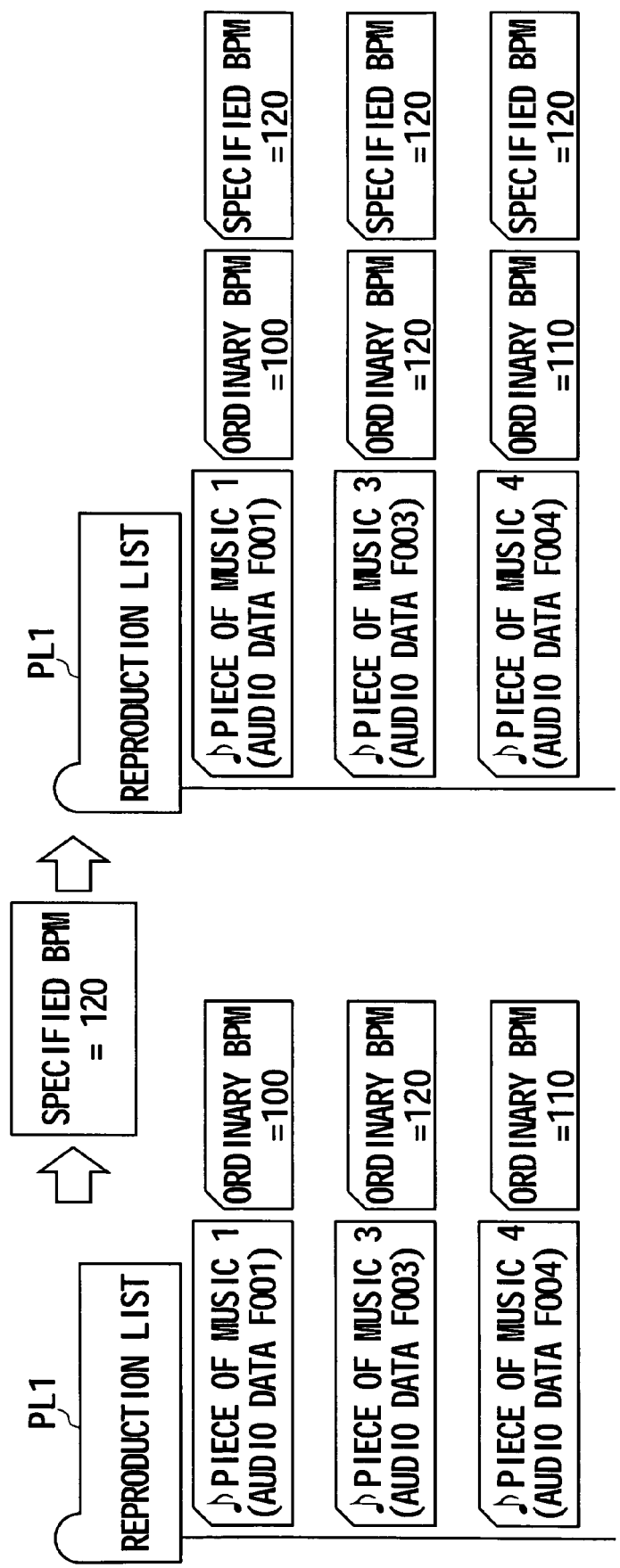
FIG. 4 is a schematic illustration of specification (1) of specified BPMs.
Figure 5:
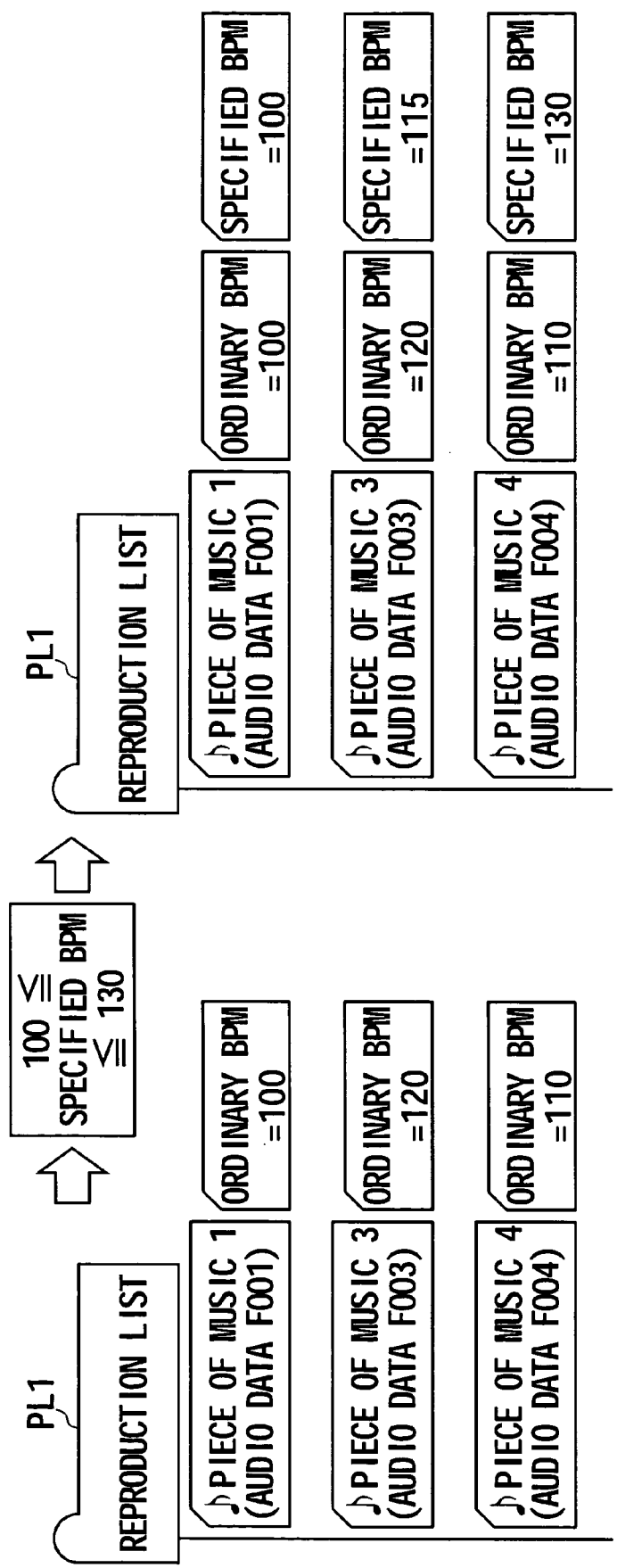
FIG. 5 is a schematic illustration of specification (2) of specified BPMs.

In this way, the portable audio player 4 is able to change the reproduction speed of the compressed audio data according to the ratio of the specified BPM to the ordinary BPM. Additionally, the portable audio player 4 is adapted to specify the BPMs of the pieces of music on the reproduction list PL1 so as to make all the specified BPMs of the pieces of music on the reproduction list PL1 equal to each other as shown in FIG. 4 or make the specified BPMs of the pieces of music on the reproduction list PL1 different from each other as shown in FIG. 5.

Figure 6A:
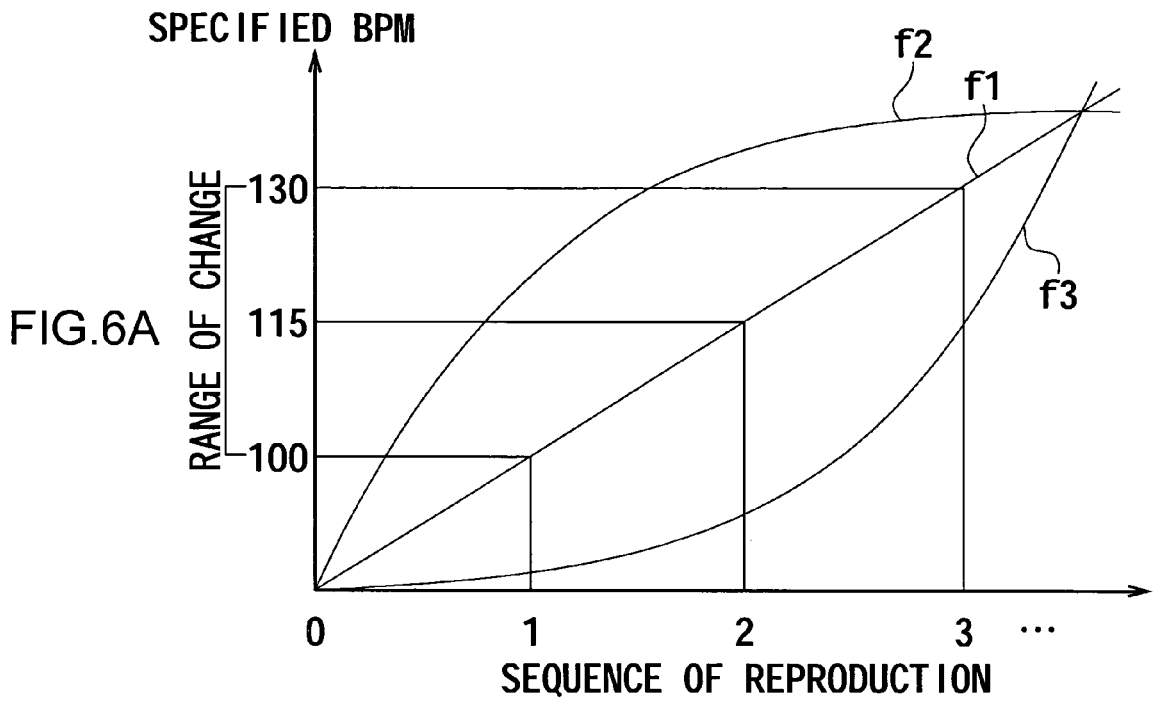
FIGS. 6A and 6B are graphs illustrating change patterns that can be used for specified BPMs.
Figure 6B:
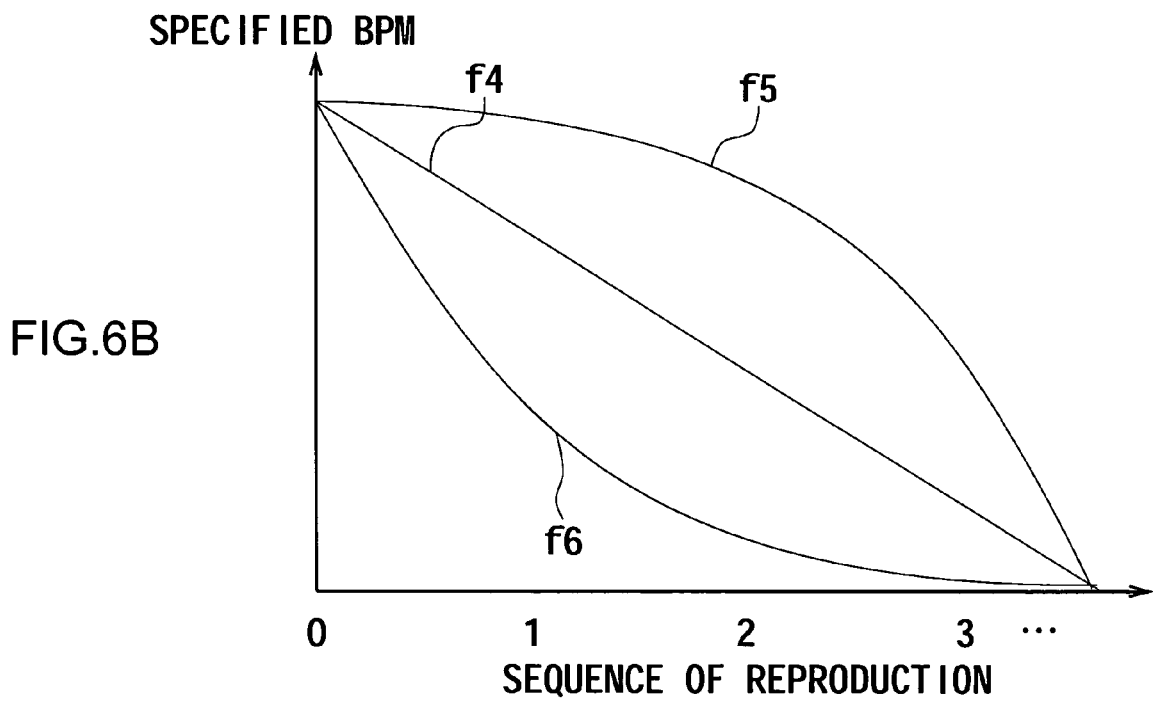

When all the specified BPMs of the pieces of music on the reproduction list PL1 are made equal to each other, the user directly input the value of the specified BPMs or several different values may be stored in the user terminal 2 and the user may be prompted to select one of them. When, on the other hand, the specified BPMs of the pieces of music on the reproduction list PL1 are made to be different from each other, functions showing how the specified BPMs change from each other as illustrated in FIGS. 6A and 6B (to be also referred to as change functions hereinafter) may be combined with ranges of change. Then, several combinations of functions and ranges of change may be stored in the user terminal 2 and the user may be prompted to select one of them.

As for change functions, for example, a linear change function f1 with which the specified BPM is incremented by a predetermined value according to the sequence of reproducing compressed audio data, a logarithmic change function f2 with which the increment of the specified BPM has a large initial value but gradually decreases or an exponential change function f3 with which the increment of the specified BPM has a small initial value but gradually increases may be used. Similarly, a linear change function f4 with which the specified BPM is decremented by a predetermined value according to the sequence of reproducing compressed audio data, a logarithmic change function f5 with which the decrement of the specified BPM has a small initial value but gradually increases or an exponential change function f6 with which the decrement of the specified BPM has a large initial value but gradually decreases may be used.

Thus, the user can select any desired value for the specified BPM of the portable audio player 4 and hence it is possible to change the speed of reproducing compressed audio data so as to gradually raise or lower the tempo of a piece of music according to the ratio of the arbitrarily selected specified BPM and the ordinary BPM.

Figure 7:
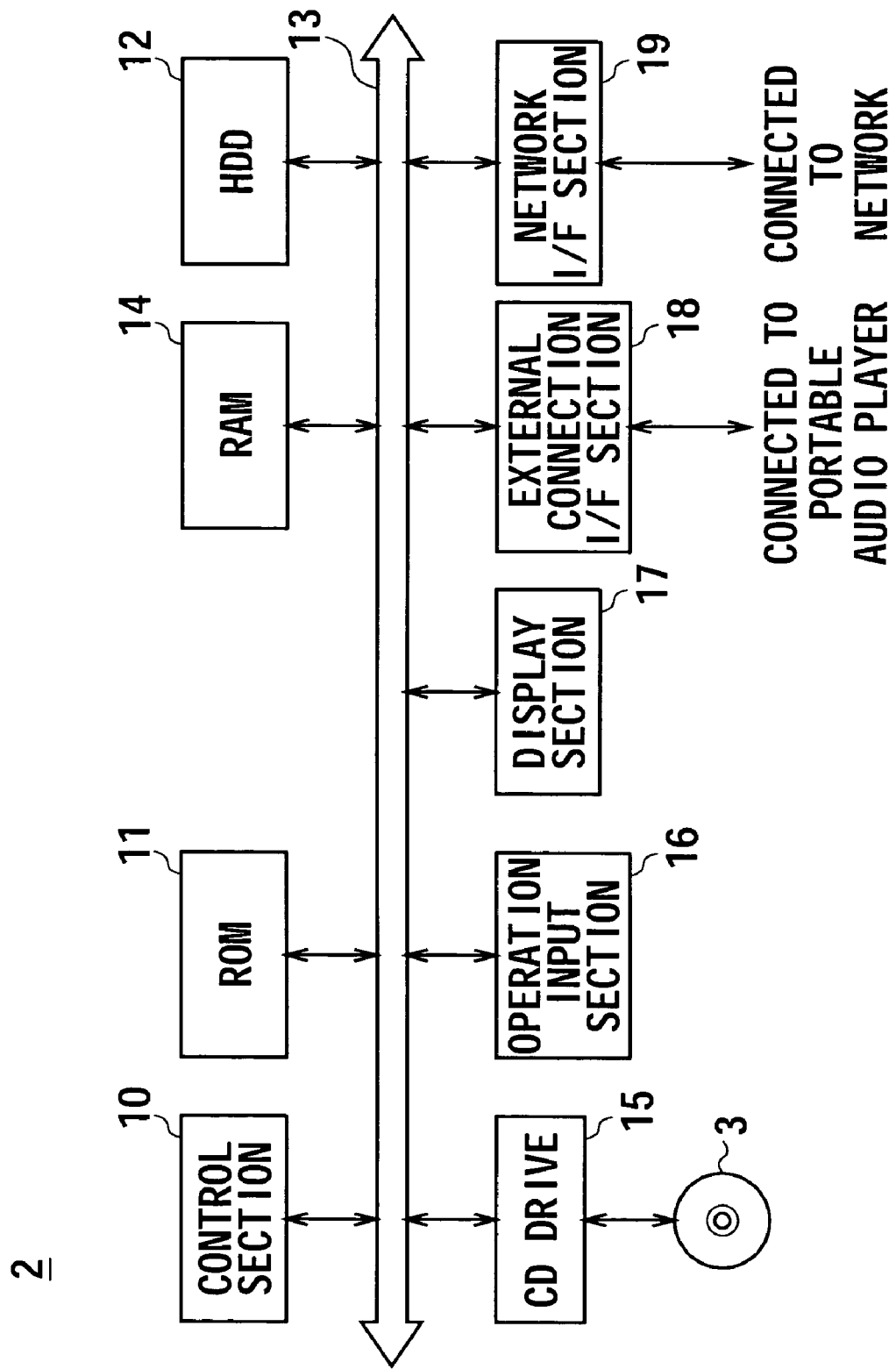
FIG. 7 is a schematic block diagram of a user terminal, illustrating the configuration thereof.

Now, the configuration of the user terminal 2 that has the above-described functional feature of preparing a list will be described below. Referring to FIG. 7, in the user terminal 2, the control section 10 reads out any of various programs stored in the Read Only Memory (ROM) 11 or the hard disk drive 12 into the Random Access Memory (RAM) 14 by way of the bus 13. Then, the control section 10 expands the read out programs on the RAM 14 and executes various processes such as preparation of a reproduction list PL1 and compression-coding of audio data according to the expanded various programs, while comprehensively controlling the portable audio player 4.

The bus 13 is connected to a CD drive 15 for reading out data from the loaded music CD 3, an operation input section 16 for carrying out various operations including input operations for the user terminal 2, a display section 17 for displaying, for example, the reproduction list PL1, an external connection interface section for externally connecting the portable audio player 4 (e.g., a Universal Serial Bus [USB]) 18 and a network interface section 19 for communicating with a predetermined server by way of the network NT.

Thus, the control section 10 reads out the audio data of a piece of music from the music CD 3 loaded in the CD drive 15, compression-codes the audio data and stores it in the hard disk drive 12. It also acquires the music-related information that corresponds to the piece of music from the music CD 3 or the predetermined server on the network NT by way of the network interface section 19 and stores it in the hard disk drive 12.

Subsequently, as a command for preparing a reproduction list PL1 is input and a range of ordinary BPM is specified by the user by way of the operation input section 16, the control section 10 prepares a reproduction list PL1 on the basis of the compressed audio data and the music-related information stored in the hard disk drive 12 and displays it on the display section 17.

Then, the control section 10 transmits the prepared reproduction list PL1 to the portable audio player 4 by way of the external connection interface section 18 along with the compressed audio data and the music-related information of the pieces of music on the reproduction list PL1 and writes them in the nonvolatile memory of the portable audio player 4.

Thus, the user terminal 2 is adapted to prepare a reproduction list PL1 for replaying the pieces of music the ordinary BPMs of which are found within a specified range.

Figure 8:
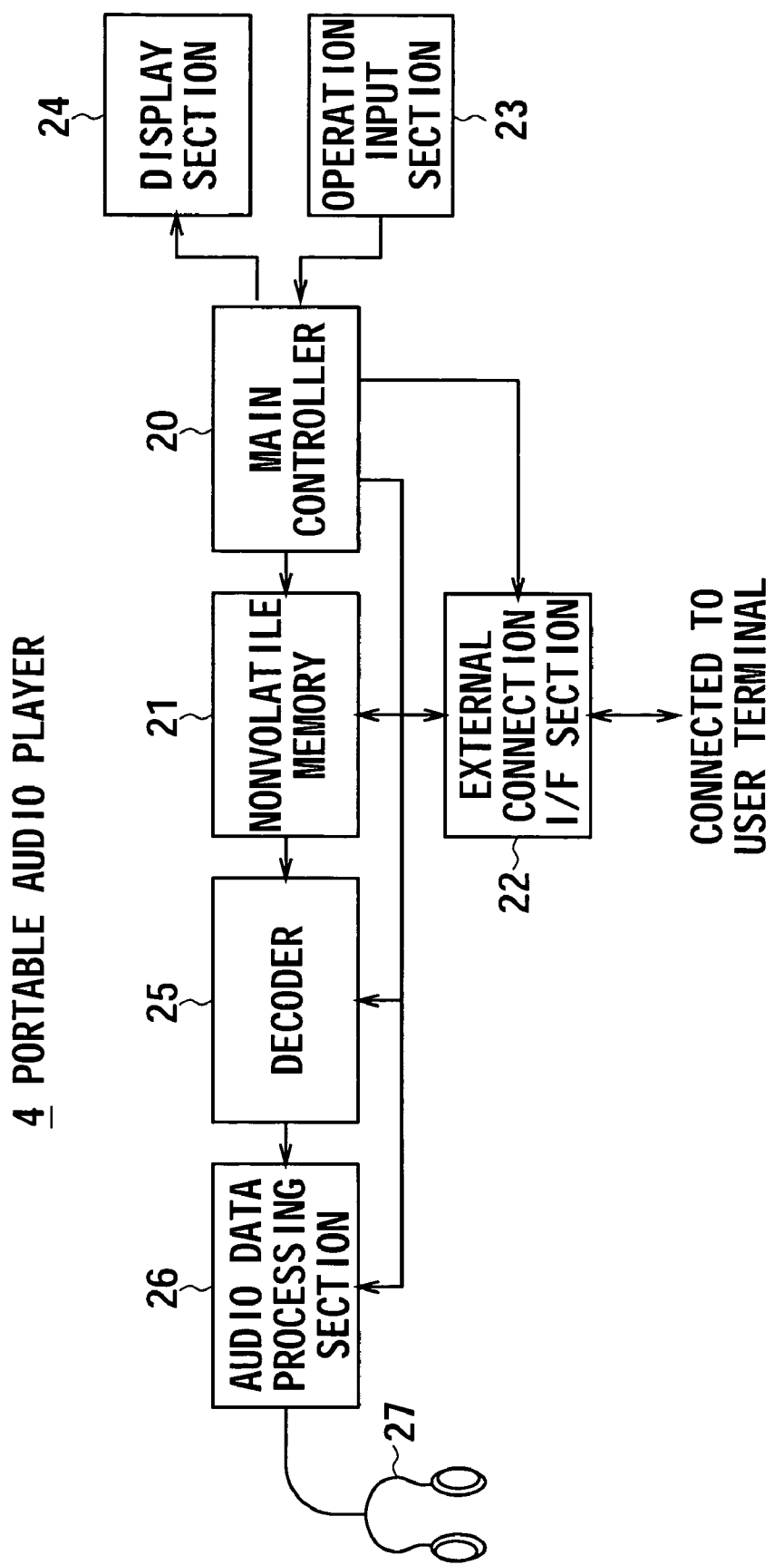
FIG. 8 is a schematic block diagram of a portable type audio player to which the first embodiment of the present invention can be applied.

Now, the configuration of the portable audio player 4 having the reproduction speed control feature will be described below. Referring to FIG. 8, main controller 20 of the portable audio player 4 comprehensively controls portable audio player 4 according to the various programs stored in an internal memory (not shown) of its own or the nonvolatile memory 21.

The portable audio player 4 is connected to the user terminal 2 by way of an external connection interface section 22 to receive the reproduction list PL1 and the compressed audio data and the music-related information that correspond to the reproduction list PL1 transmitted from the user terminal 2 by way of the external connection interface section 22 (e.g., a USB) and write them in the nonvolatile memory 21.

Figure 9:
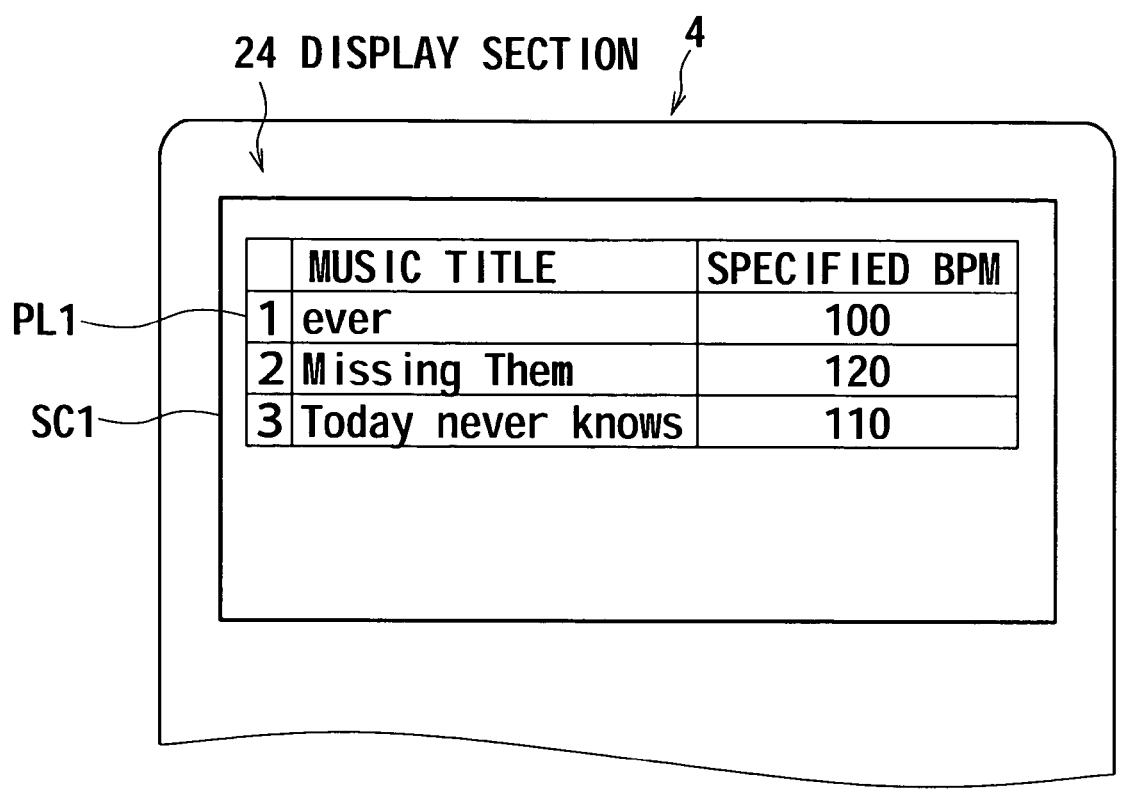
FIG. 9 is a schematic illustration of a display screen showing a reproduction list.

Subsequently, the portable audio player 4 is taken away from the user terminal 2 and may typically be carried by the user. Then, as the user gives a command to the portable audio player 4 by way of operation input section 23 to display the reproduction list PL1, the main controller 20 reads out the reproduction list PL1 and the music-related information from the nonvolatile memory 21 and displays a reproduction list display image SC1 that includes the reproduction list PL1 and the music-related information arranged in association with each other typically as shown in FIG. 9 on display section 24. Note that, in FIG. 9, the reproduction list PL1 and the titles of the pieces of music and only the ordinary BPMs are displayed in association with each other out of the music-related information in consideration of the display region of the display section 24 of the portable audio player 4. Thus, the portable audio player 4 can show the user information on the pieces of music that can be replayed (including the titles of the pieces of music and the ordinary BPMs in the case of FIG. 9) and the sequence of replay.

Then, as values for specified BPMs are input by the user or a combination of a range of specified BPMs and a change function selected from the change functions f1 through f6 stored in the nonvolatile memory 21 is selected by the user by way of the operation input section 23, the main controller 20 specifies the values of the specified BPMs for the pieces of music on the reproduction list PL1.

When a command for replaying pieces of music is input by the user by way of the operation input section 23 after specifying specified BPMs, the main controller 20 reads out the compressed audio data and the music-related information of the first piece of music on the reproduction list PL1 from the nonvolatile memory 21. Then, the main controller 20 sends out the compressed audio data it has read out to the decoder section 25 and also the ratio of the specified BPM (assumed to be "120" here as an example) to the ordinary BPM (assumed to be "100" here as an example) contained in the read out music-related information (and hence 120/100 here) to audio data processing section 26.

The decoder section 25 obtains the audio data by executing a predetermined expansion-decoding process on the compressed audio data and sends it out to audio data processing section 26. The audio data processing section 26 has a digital pitch controller that can control the reproduction speed of audio data according to the ratio of the specified BPM to the ordinary BPM supplied from the main controller 20 without changing the pitches of the corresponding piece of music. Thus, it controls the reproduction speed of the audio data according to the ratio of the specified BPM and the ordinary BPM (120/100) (1.2 times of the ordinary speed) by means of the digital pitch controller and executes a D/A conversion process on the audio data to obtain the corresponding audio signal so as to output the sounds that corresponds to the audio signal (and hence the piece of music) by way of an earphone 27.

The main controller 20 executes such a series of processes also on the compressed audio data of the second and subsequent pieces of music according to the reproduction list PL1.

In this way, the portable audio player 4 controls the reproduction speed of the compressed audio data according to the ratio of the specified BPM specified by the user to the corresponding ordinary BPM obtained as music-related information.

(1-3) Process Sequence from Recording to Replay

Now, the process sequence from the recording of a piece of music and the replay of the piece of music by the above-described recording/reproduction system 1 will be described below by referring to the flowcharts of FIGS. 10, 11, 14 and 15.

Figure 10:
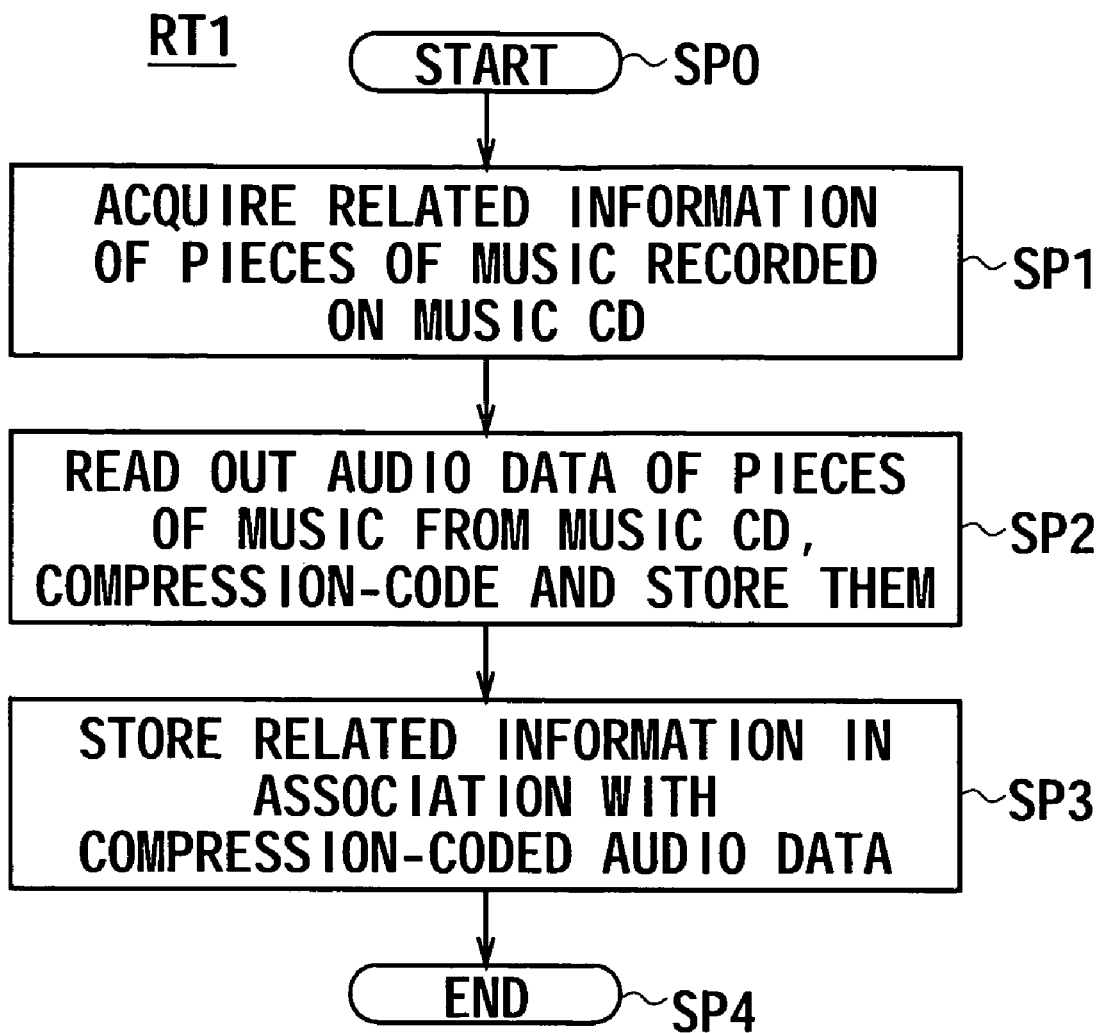
FIG. 10 is a flowchart of a music recording process sequence.

Firstly, the process sequence to be followed by the user terminal 2 when the latter records a piece of music (to be also referred to as music recording process sequence hereinafter) will be described below. Referring to FIG. 10, as a music CD 3 is loaded in the CD drive 15, the control section 10 of the user terminal 2 automatically starts the music recording process sequence RT1 from a starting step, or Step SP0. Alternatively, it may be so arranged that the control section 10 of the user terminal 2 starts the music recording process sequence RT1 from a starting step, or Step SP0, when it receives a recording command by way of the operation input section 16 when a music CD 3 is loaded in the CD drive 15. Then, the control section 10 moves to Step SP1.

In Step SP1, the control section 10 acquires the music-related information of the piece of music recorded on the music CD 3 loaded in the CD drive 15 or from a predetermined server on the network NT and moves to the next step, or Step SP2.

Then, in Step SP2, the control section 10 reads out the audio data of a specified piece of music from the music CD 3, compression-codes the audio data and stores it in the hard disk drive 12 before it moves to the next step, or Step SP3. In Step SP3, the control section 10 stores the file name of the compressed audio data stored in the hard disk drive 12 and the acquired music-related information in association with each other in the music-related information management table TB1 that is generated in the hard disk drive 12. Then, the control section 10 moves to end step SP4 to end the recording process sequence RT1.

In this way, the control section 10 of the user terminal 2 can record and store pieces of music recorded on the music CD 3 in its own hard disk drive 12 as compressed audio data and also stores the music-related information acquired from the music CD 3 or the predetermined server in association with the compressed audio data in the hard disk drive 12.

Now, the process sequence to be followed by the user terminal 2 when the latter prepares a reproduction list PL1, utilizing the compressed audio data and the ordinary BPMs in the music-related information it has stored in the hard disk drive 12 will be described below (to be also referred to as reproduction list preparation process sequence hereinafter).

Figure 11:
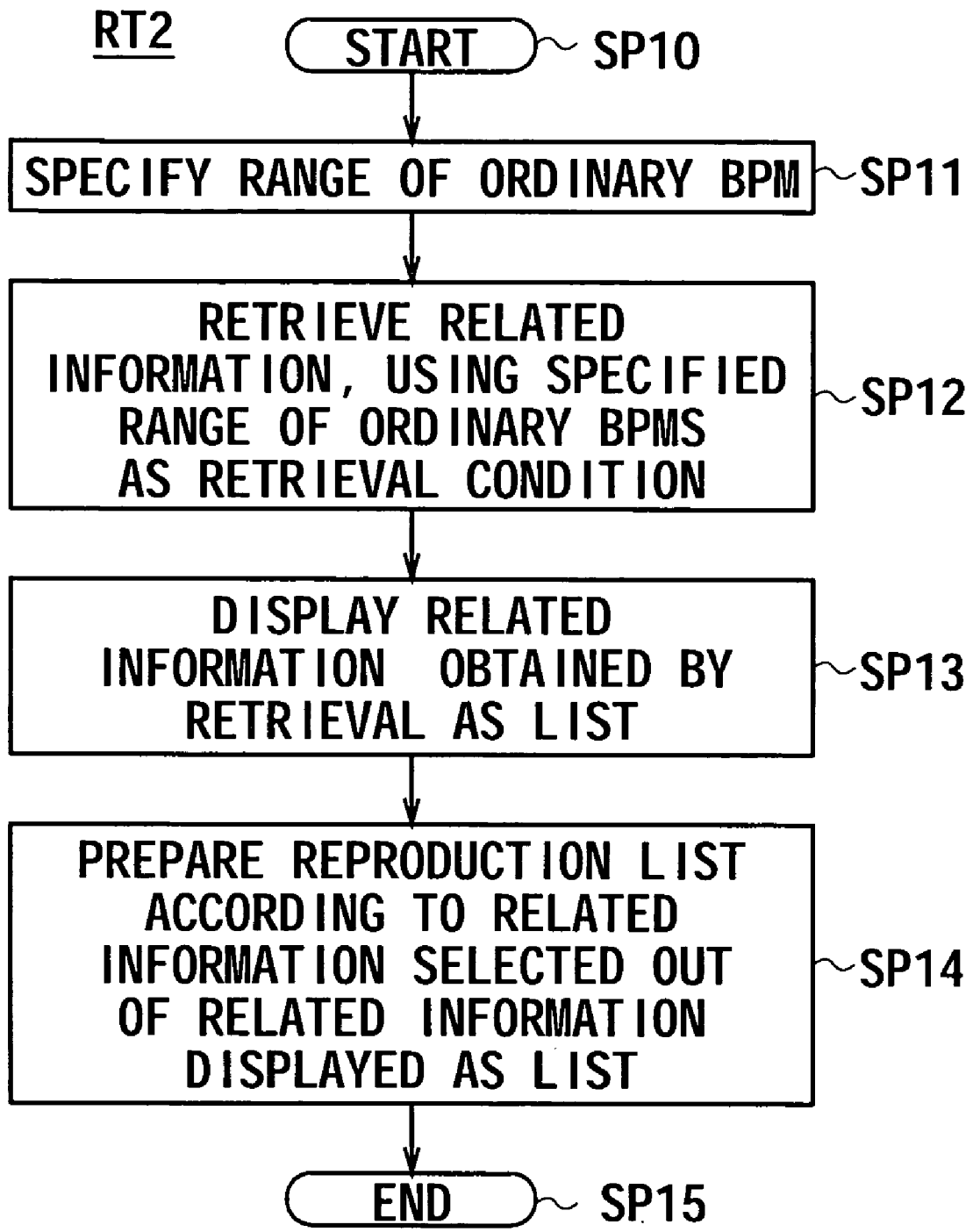
FIG. 11 is a flowchart of a reproduction list preparation process sequence.

Referring to FIG. 11, upon receiving a command for preparing a reproduction list PL1 typically by way of the operation input section 16, the control section 10 of the user terminal 2 starts the reproduction list preparation process sequence RT2 at start step SP10 and then moves to Step SP11.

Figure 12:
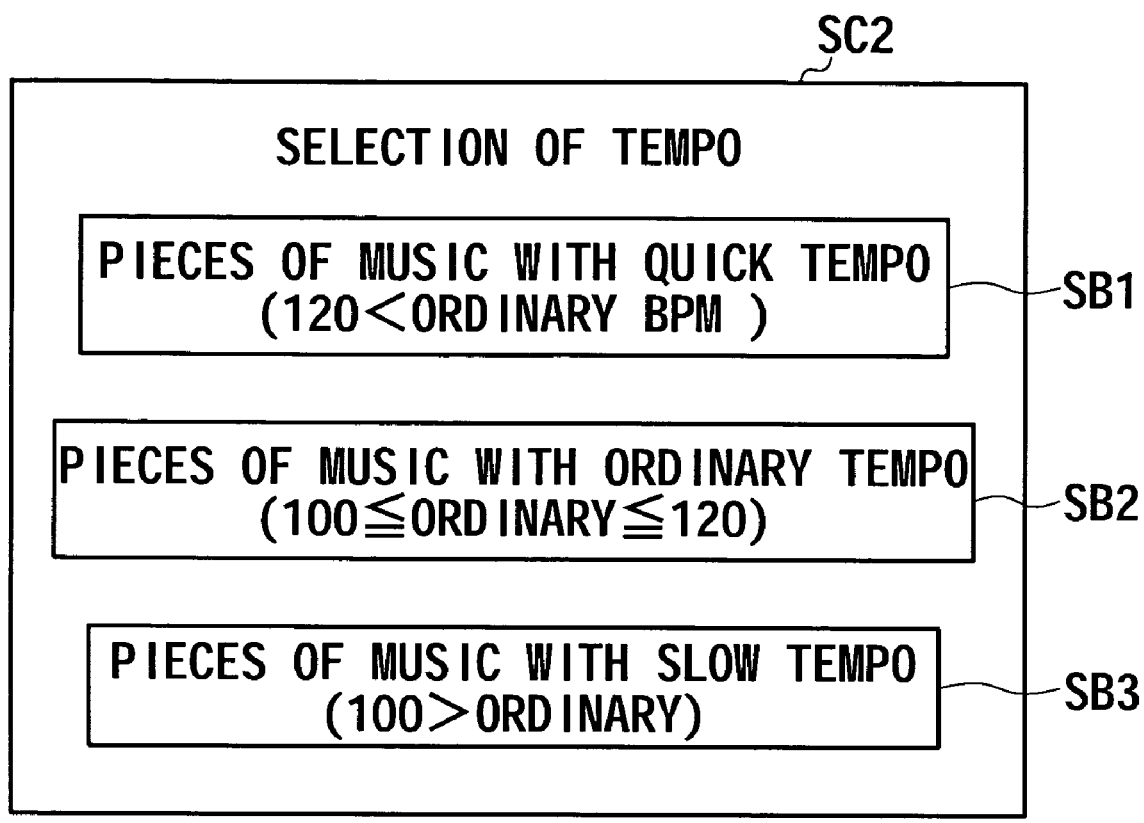
FIG. 12 is a schematic illustration of a display screen showing an image for selecting a specified BPM.

In Step SP11, the control section 10 prompts the user to input or select a range of ordinary BPMs by means of the operation input section 16 so as to specify a range of ordinary BPMs and then moves to the next step, or Step SP12. When the user is prompted to select a range of ordinary BPMs, the control section 10 displays an ordinary BPM selection image SC2 for prompting the user to select a range of ordinary BPMs as shown in FIG. 12 on the display section 17. The ordinary BPM selection image SC2 includes, for example, selection button SB1 for selecting "120<ordinary BPMs", selection button SB2 for selecting "100≦ordinary BPMs≦120" and selection button SB3 for selecting "100>ordinary BPMs". Additionally, character messages "pieces of music with a quick tempo (120<ordinary BPMs)", "pieces of music with an ordinary tempo 100≦ordinary BPMs≦120) and "pieces of music with a slow tempo (100>ordinary BPMs) are displayed respectively on the selection buttons SB1, SB2 and SB3. Thus, for example, when the selection button BS2 is operated by the user by way of the operation input section 16, the control section 10 specifies "100≦ordinary BPMs≦120" as range of ordinary BPMs in response to the button selection.

In this way, when the user is prompted to select a range of ordinary BPMs, the user terminal 2 does not simply show values of ordinary BPMs but shows the actual degrees of speed that correspond respectively to such values of ordinary BPMs in the form of character information. Thus, the user can intuitively imagine the playing speed of a piece of music for a value of ordinary BPM.

After specifying a range of ordinary BPM, the control section 10 moves to the next step, or Step SP12, where it retrieves the music-related information on pieces of music that meet the requirement of the specified range of ordinary BPMs from the music-related information management table TB1 and moves to the next step, or Step SP13.

In Step SP13, the control section 10 displays a retrieval results displaying image SC3 that includes a list SL of pieces of music and their music-related information obtained as a result of the retrieval (to be also referred to as retrieval results list hereinafter) (more specifically, pieces of music having ordinary BPM values found within the specified range) on the display section 17 and moves to the next step, or Step SP14.

Figure 13:
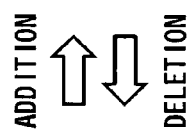
FIG. 13 is a schematic illustration of a display screen showing the results of a retrieval operation.

The retrieval results displaying image SC3 does not simply shows a retrieval results list SL but is so designed that the user can select one or more than one pieces of music to the reproduction list PL1 from the retrieval results list SL. Thus, a reproduction list PL1 prepared by using the music-related information on the one or more than one pieces of music selected from the retrieval results list SL is displayed in addition to the retrieval results list SL as shown in FIG. 13.

In Step SP14, the control section 10 prompts the user to select the music-related information to be added to the reproduction list PL1 from the retrieval results list SL in the retrieval results displaying image SC3 (typically by dragging & dropping from the retrieval results list SL to the reproduction list PL1 by means of a mouse). Then, the control section 10 recognizes the music-related information on the one or more than one pieces of music to be added to the reproduction list PL1 and prepares an updated reproduction list PL1. The user can also delete any music-related information added to the reproduction list PL1 in the retrieval results displaying image SC3 (typically by dragging & dropping from the reproduction list PL1 to the retrieval results list SL by means of a mouse).

Thus, the control section 10 prepares a reproduction list PL1 for reproducing the compressed audio data of the pieces of music that corresponds to the music-related information selected by the user in the sequence specified by the user and then moves to end step SP15, where it ends the reproduction list preparation process sequence RT2.

In this way, the control section 10 of the user terminal 10 prepares a reproduction list PL1 for replaying the pieces of music the ordinary BPMs of which are found within the range specified by the user from the compressed audio data stored in the hard disk drive 12 in the sequence specified by the user.

Additionally, when the control section 10 of the user terminal 2 receives a command for transferring the reproduction list PL1 to the portable audio player 4 by way of the operation input section 16, it transfers the reproduction list PL1 and the compressed audio data and the music-related information based on the reproduction list PL1 to the portable audio player 4 by way of the external connection interface section 18 and writes them in the nonvolatile memory 21 of the portable audio player 4.

Now, the process sequence to be followed by the portable audio player 4 when replaying pieces of music will be described below. As pointed out above, the portable audio player 4 can replay pieces of music either in a mode of operation where a unique value is specified for the specified BPMs of compressed audio data (to be also referred to as constant BPM reproduction mode hereinafter) or in a mode of operation where the specified BPMs of compressed audio data are changed (to be also referred to as variable BPM reproduction mode hereinafter). The process sequence of each of theses two modes will be described below.

Figure 14:
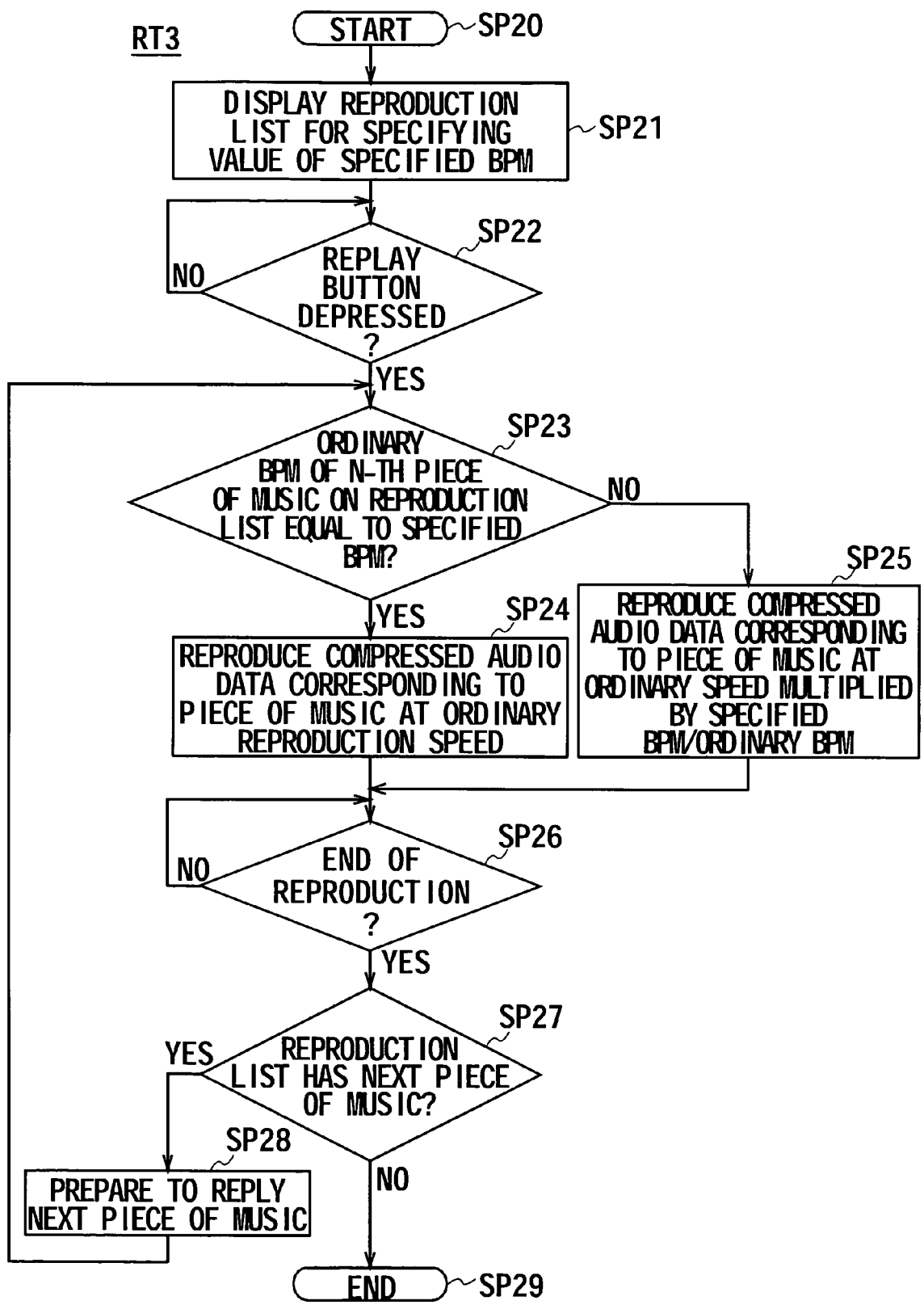
FIG. 14 is a flowchart of a constant BPM reproduction process sequence.

Firstly, the process sequence in a constant BPM reproduction mode (to be also referred to as constant BPM reproduction process sequence hereinafter) will be described below. Referring to FIG. 14, as the constant specified BPM reproduction mode is selected by the user by way of the operation input section 23 in a state where the portable audio player 4 is taken away from the user terminal 2, the main controller 20 of the portable audio player 4 starts the constant BPM reproduction process sequence RT3 at start step SP20 and then moves to Step SP21.

In Step SP21, the main controller 20 reads out the reproduction list PL1 and the music-related information from the nonvolatile memory 21 and displays the reproduction list display image SC1 formed on the basis of the read out information on the display section 24. At the same time, it prompts the user to input a specified value for the specified BPM by way of the operation input section 23 in order to specify a value for the specified BPM and then moves to the next step, or Step SP22.

In Step SP22, the main controller 20 waits for an operation by the user of depressing the replay button that is arranged in the operation input section 23 and, upon recognizing that the replay button is depressed, it moves to the next step, or Step SP23.

In Step SP23, the main controller 20 determines when the specified value of the specified BPM agrees with the value of the ordinary BPM in the music-related information of the first piece of music on the reproduction list PL1 or not. When the answer to the question is affirmative, it means that both the specified value of the specified BPM and the value of the ordinary BPM in the music-related information of the first piece of music may be equal to "100". Then, the main controller 20 moves to Step SP24, where it reads out the compressed audio data of the first piece of music from the nonvolatile memory 21 and transmits it to the decoder section 25 and, at the same time, the ratio of the specified value of the specified BPM to the value of the ordinary BPM of the first piece of music (100/100) to the audio data processing section 26 so as to replay the first piece of music, controlling the reproduction speed of the compressed audio data of the first piece of music to make it agree with the ordinary reproduction speed. Then, the main controller 20 moves to the next step, or Step SP26.

In this way, when the value of the specified BPM as specified by the user and the value of the ordinary BPM of the piece of music to be replayed are equal to each other, the main controller 20 controls the reproduction speed of the compressed audio data of the piece of music to make it agree with the ordinary reproduction speed.

When, on the other hand, the answer to the question is negative in Step SP22, it means that the specified value of the specified BPM may be "120" whereas the value of the ordinary BPM in the music-related information of the first piece of music may be "100". Then, the main controller 20 moves to Step SP25, where it reads out the compressed audio data of the first piece of music from the nonvolatile memory 21 and transmits it to the decoder section 25 and, at the same time, the ratio of the specified value of the specified BPM to the value of the ordinary BPM of the first piece of music (120/100) to the audio data processing section 26 so as to control the reproduction speed of the compressed audio data of the first piece of music to make it agree with 1.2 times of the ordinary reproduction speed before it moves to the next step, or Step SP26.

In this way, when the value of the specified BPM as specified by the user and the value of the ordinary BPM of the piece of music to be replayed do not agree with each other, the main controller 20 controls the reproduction speed of the compressed audio data of the piece of music to make it agree with (the value of the specified BPM/the value of the ordinary BPM) times of the ordinary reproduction speed.

In Step SP26, the main controller 20 waits for the end of replaying the first piece of music and, when it recognizes that the replay of the piece of music ends, it moves to the next step of Step SP27. In Step SP27, the main controller 20 determines when the reproduction list PL1 includes the second piece of music to be replayed or not.

When the answer to the question is affirmative, it means that the reproduction list PL1 includes the second piece of music to be replayed. Then, the main controller 20 moves to Step SP28, where it prepares for replaying the second piece of music, and then it returns to Step SP23.

In this way, the main controller 20 repeats the processing steps from Step SP23 to Step SP27 for each piece of music until the answer to the question in Step SP27 becomes negative and hence until all the pieces of music on the reproduction list PL1 have been replayed. When all the pieces of music on the reproduction list PL1 have been replayed and the answer to the question in Step SP27 becomes negative, the main controller 20 moves to end step SP29 to end the constant BPM reproduction process sequence RT3.

With the above-described sequence, the main controller 20 of the portable audio player 4 holds the specified BPMs of the pieces of music to a constant value and controls the reproduction speed of the compressed audio data of the pieces of music to make all the tempos of the pieces of music equal to each other when they are replayed.

Figure 15:
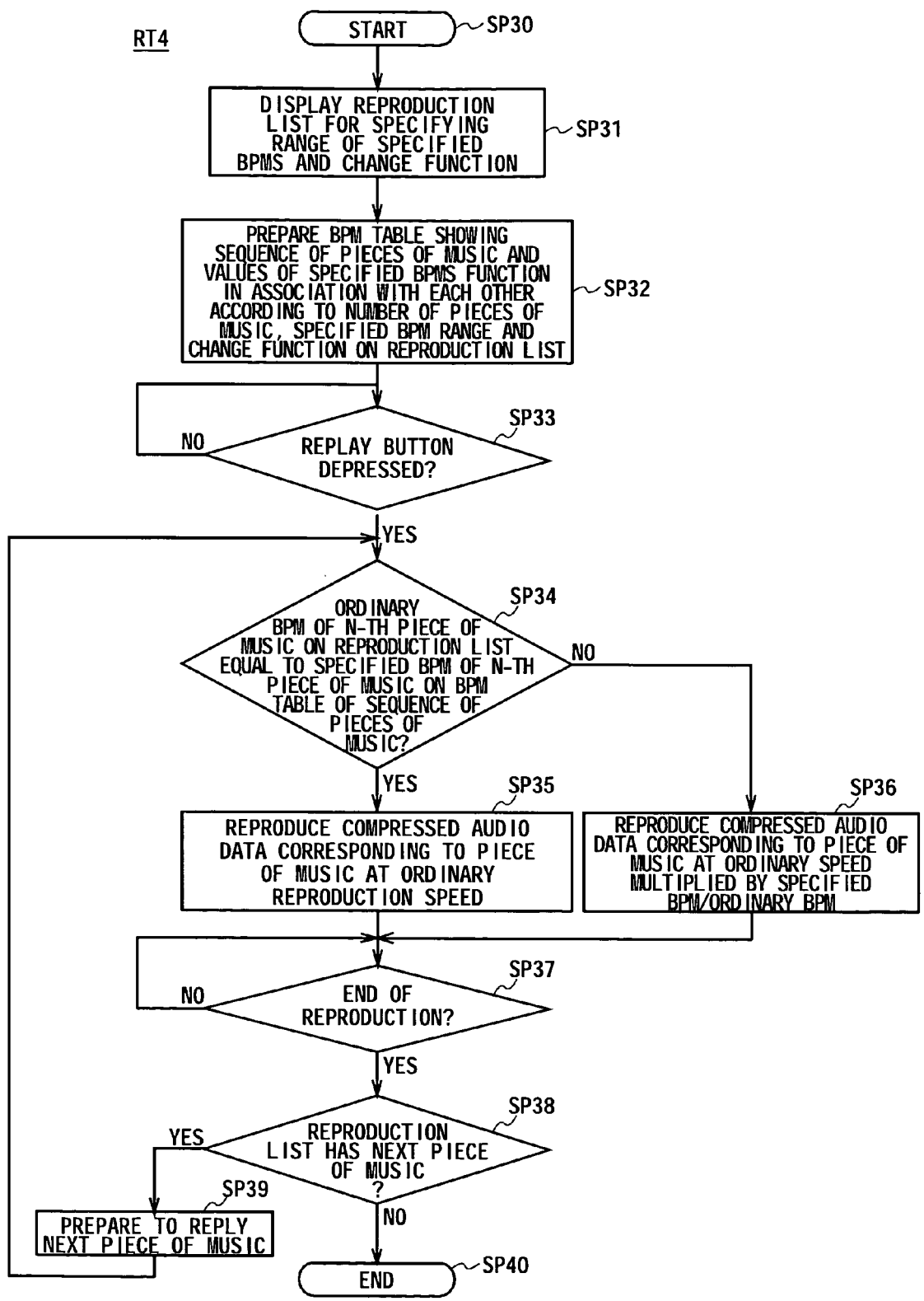
FIG. 15 is a flowchart of a variable BPM reproduction process sequence.

Now, the process sequence of the variable BPM reproduction mode (to be also referred to as variable BPM reproduction process sequence hereinafter) will be described below. Referring to FIG. 15, as the variable specified BPM reproduction mode is selected by the user by way of the operation input section 23 in a state where the portable audio player 4 is taken away from the user terminal 2, the main controller 20 of the portable audio player 4 starts the variable BPM reproduction process sequence RT4 at start step SP30 and then moves to Step SP31.

In Step SP31, the main controller 20 reads out the reproduction list PL1 and the music-related information from the nonvolatile memory 21 and displays the reproduction list display image SC1 formed on the basis of the read out information on the display section 24. At the same time, it prompts the user to select one of the combinations of specified BPM ranges and change functions f1 through f6 by way of the operation input section 23 and specifies a specified BPM range and one of the change functions f1 through f6 to be used before it moves to the next step, or Step SP32.

In Step SP32, the main controller 20 prepares a table TB3, where the number of pieces of music, the sequence of replaying pieces of music and the corresponding respective values of the specified BPMs (to be also referred to as BPM table of the sequence of pieces of music hereinafter) are associated with each other, on the basis of the number of pieces of music on the reproduction list PL1, the specified BPM range and the change function to be used as selected from the change functions f1 through f6 and records the table TB3 in the nonvolatile memory 21.

More specifically, when the number of pieces of music on the reproduction list PL1 is n, the n-th piece of music in the sequence of replaying the pieces of music is Tn and the value of the specified BPM of the piece of music is Nn, the specified BPM range is A≦Nn≦B and the change function selected from the change functions f1 through f6 is f(Tn), the main controller 20 determines the value of the specified BPM of each of the pieces of music by means of the formula shown below:

$$f(Tn)=A \ldots Nn \ldots B \quad (1)$$

and then it prepares a BPM table TB3 of the sequence of pieces of music. After preparing the BPM table TB3 of the sequence of pieces of music in this way, the main controller 20 moves to the next step, or Step SP33.

In Step SP33, the main controller 20 waits for an operation by the user of depressing the replay button that is arranged in the operation input section 23 and, upon recognizing that the replay button is depressed, it moves to the next step, or Step SP34.

In Step SP34, the main controller 20 determines when the value of the specified BPM of the first piece of music on the BPM table TB3 of the sequence of pieces of music agrees with the value of the ordinary BPM of the first piece of music on the reproduction list PL1 or not. When the answer to the question is affirmative, it means that both the value of the specified BPM of the first piece of music on the BPM table TB3 of the sequence of pieces of music and the value of the ordinary BPM of the first piece of music on the reproduction list PL1 may be equal to "100". Then, the main controller 20 moves to Step SP35, where it reads out the compressed audio data of the first piece of music from the nonvolatile memory 21 and transmits it to the decoder section 25 and, at the same time, the ratio of the specified value of the specified BPM to the value of the ordinary BPM of the first piece of music (100/100) to the audio data processing section 26 so as to replay the first piece of music, controlling the reproduction speed of the compressed audio data of the first piece of music to make it agree with the ordinary reproduction speed. Then, the main controller 20 moves to the next step, or Step SP37.

When, on the other hand, the answer to the question is negative in Step SP34, it means that the value of the specified BPM of the first piece of music on the BPM table TB3 of the sequence of pieces of music may be "120" whereas the value of the ordinary BPM of the first piece of music on the reproduction list PL1 may be "100". Then, the main controller 20 moves to Step SP36, where it reads out the compressed audio data of the first piece of music from the nonvolatile memory 21 and transmits it to the decoder section 25 and, at the same time, the ratio of the value of the specified BPM to the value of the ordinary BPM (120/100) to the audio data processing section 26 so as to control the reproduction speed of the compressed audio data of the first piece of music to make it agree with 1.2 times of the ordinary reproduction speed before it moves to the next step, or Step SP37.

In Step SP37, the main controller 20 waits for the end of replaying the first piece of music and, when it recognizes that the replay of the piece of music ends, it moves to the next step of Step SP38. In Step SP38, the main controller 20 determines when the reproduction list PL1 includes the second piece of music to be replayed or not.

When the answer to the question is affirmative, it means that the reproduction list PL1 includes the second piece of music to be replayed. Then, the main controller 20 moves to Step SP39, where it prepares for replaying the second piece of music, and then it returns to Step SP34.

In this way, the main controller 20 repeats the processing steps from Step SP34 to Step SP38 for each piece of music until the answer to the question in Step SP38 becomes negative and hence until all the pieces of music on the reproduction list PL1 have been replayed. When all the pieces of music on the reproduction list PL1 have been replayed and the answer to the question in Step SP38 becomes negative, the main controller 20 moves to end step SP40 to end the variable BPM reproduction process sequence RT4.

With the above-described sequence, the main controller 20 of the portable audio player 4 changes the specified BPMs of the pieces of music according to the combination of a variable range and a change function selected from the change functions f1 through f6 to control the reproduction speed of the compressed audio data of the pieces of music so as to make the tempos of the pieces of music gradually quicker or slower by the ratio of the specified BPM to the ordinary BPM of each of the pieces of music.

(1-4) Operation and Advantages

With the above-described arrangement, the recording/reproduction system 1 records the pieces of music on the music CD 3 loaded in the user terminal 2 by reading out the audio data of the pieces of music from the music CD 3, compressing-coding the read out audio data and storing them in the hard disk drive 12 of the user terminal 2.

Additionally, the user terminal 2 acquires the music-related information of the pieces of music from the loaded music CD 3 or a predetermined server on the network NT that contains the tempos of the pieces of music when they are replayed ordinarily and also stores the music-related information in the hard disk drive 12 in association with the compressed audio data. In this way, the recording/reproduction system 1 stores and manages the compressed audio data of the pieces of music and their ordinary BPMs in association with each other.

Subsequently, when the user terminal 2 prepares an updated reproduction list PL1 of the pieces of music recorded in the hard disk drive 12, it prompts the user to specify the range of ordinary BPMs as requirement to be met for selecting one or more than one pieces of music to be added to the reproduction list PL1. Then, the user terminal 2 prepares an updated reproduction list PL1, adding one or more than one pieces of music, the ordinary BPMs of which are found within the range specified by the user, to the existing reproduction list PL1.

In this way, the user terminal 2 can prepare an updated reproduction list PL1 of pieces of music to be replayed having tempos that are substantially equal to each other with ease by utilizing the ordinary BPMs that are acquired as music-related information and selecting the pieces of music according to their ordinary BPMs.

Additionally, the user terminal 2 transfers the reproduction list PL1 prepared in the above-described manner along with the compressed audio data and the music-related information of the pieces of music on the reproduction list PL1 to the portable audio player 4 externally connected to it and writes them in the nonvolatile memory of the portable audio player 4.

Thus, when the portable audio player 4 replays the pieces of music according to the reproduction list PL1, it prompts the user to specify the specified BPM of each of the pieces of music that indicates the tempo of the piece of music when it is actually replayed by the portable audio player 4. Then, the portable audio player 4 controls the reproduction speed of the compressed audio data of each of the pieces of music according to the ratio of the specified BPM that is specified by the user to the ordinary BPM of the piece of music acquired as music-related information.

As a result, the portable audio player 4 can control the operation of replaying the pieces of music so as to replay all the pieces of music with the same tempo by specifying a constant vale for the specified BPMs of the pieces of music.

Alternatively, the portable audio player 4 can control the operation of replaying the pieces of music so as to replay the pieces of music in such a way their tempos are incremented or decremented according to the sequence of replay by associating the specified BPMs of the pieces of music with a predetermined function to gradually increase or decrease, whichever appropriate, the values of their specified BPMs according to the sequence of replay.

With the above-described arrangement, the reproduction list PL1 and the specified BPMs of pieces of music that are to be used to control the operation of replaying the pieces of music are prepared on the basis of their ordinary BPMs that indicate the tempos specified in advance for the respective pieces of music (and hence the reproduction speeds specified in advance by the audio data of the respective pieces of music) so that it is now possible to prepare with ease a reproduction list PL1 for replaying only pieces of music having the same tempo or a reproduction list PL1 and specified BPMs for changing the tempo of each of the pieces of music to a desired one. Thus, it is also possible to replay with ease each of the pieces of music with a desired tempo (or a reproduction speed) according to the reproduction list PL1 and the specified BPMs.

(2) Second Embodiment

Now, the second embodiment of the invention will be described below in detail. The second embodiment is identical with the above-described first embodiment except that the portable audio player 4 is adapted to specify the value of the specified BPM of each piece of music by using the pulse of the user observed by means of a pulsimeter (which will be described in greater detail hereinafter) connected to an external connection interface 22 at the time of replaying the piece of music. Therefore, the configuration of the user terminal 2 and the process sequence for recording that are the same as those of the first embodiment will not be described below any further.

(2-1) Configuration of Portable Audio Player

Figure 17:
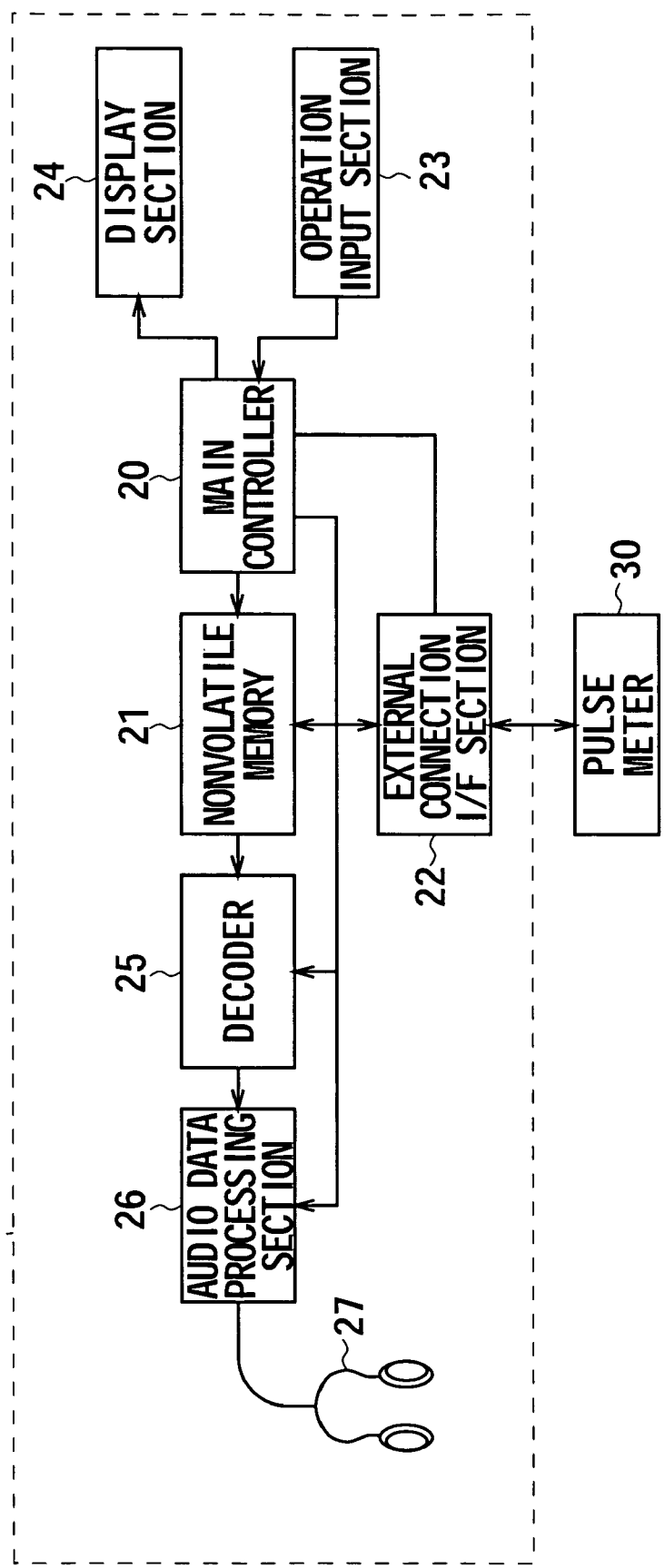
FIG. 17 is a schematic block diagram of a portable type audio player to which a second embodiment of the present invention can be applied.

Referring to FIG. 17, in which the components same as those of FIG. 8 are denoted respectively by the same reference symbols, the portable audio player 4 of the second embodiment records a reproduction list PL1 of the pieces of music received from the user terminal 2 by way of the external connection interface 22 in the nonvolatile memory 21 along with the compressed audio data and the music-related information of the pieces of music and thereafter, when it replays the pieces of music, it is taken away from the user terminal 2 and a pulsimeter 30 is connected to the external connection interface 22.

The pulsimeter 30 is an instrument for observing the pulse of the user who is going to listen to the pieces of music by means of the portable audio player 4. It is adapted to transmit the number of pulses per minute (typically from about 80 to about 120) of the user to the portable audio player 4 whenever necessary.

Upon receiving a command for replaying the pieces of music by way of the operation input section 23, the main controller 20 of the portable audio player 4 specifies the pulse (e.g., "110") obtained from the pulsimeter 30 for the specified BPM and reads out the compressed audio data and the music-related information of the first piece of music on the reproduction list PL1 from the nonvolatile memory 21.

Then, the main controller 20 sends out the compressed audio data it has read out to the decoder section 25 and also the ratio of the specified BPM to the ordinary BPM (e.g., "100") of the read out first piece of music (and hence 110/100) to the audio data processing section 26.

The decoder section 25 acquires the original audio data by executing a predetermined expansion-decoding process on the compressed audio data and transmits it to the audio data processing section 26. The audio data processing section 26 controls the reproduction speed (1.1 times) of the audio data so as to make it agree with a value that corresponds to the ratio of the ordinary BPM to the specified BPM by means of the digital pitch controller and acquires an audio signal by executing a D/A conversion process on the audio data. Then, it outputs the sounds of the piece of music by way of the earphone 27 according to the audio signal.

The main controller 20 executes the above-described series of processes on the compressed audio data of the second and the subsequent pieces of music according to the reproduction list PL1.

In this way, the portable audio player 4 controls the reproduction speed of compressed audio data according to the ratio of the specified BPM specified on the basis of the pulse of the user to the ordinary BPM acquired as music-related information.

(2-2) Replay Process Sequence

Now, the process sequence for replaying pieces of music by utilizing the pulse of the user will be described in detail by referring to the flowchart of FIG. 18.

Figure 18:
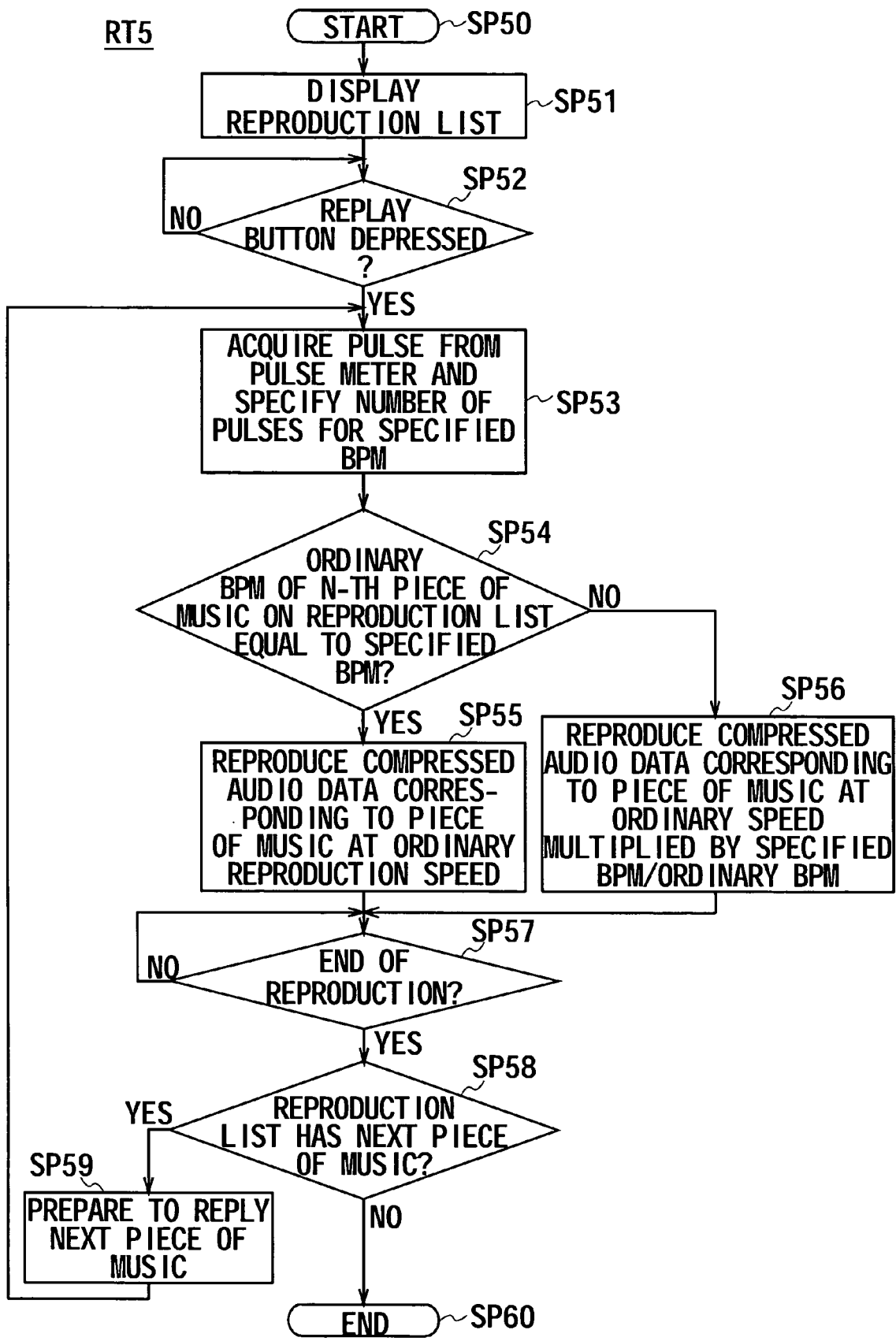
FIG. 18 is a flowchart of a music reproduction process sequence that can be used for the purpose of the second embodiment.

As shown in FIG. 18, as the user issues a command for displaying a reproduction list PL1 by way of the operation input section 23 in a state where the portable audio player 4 is taken away from the user terminal 2 and the pulsimeter 30 is connected to the user terminal 2, the main controller 20 of the portable audio player 4 starts the reproduction process sequence RT5 at start step SP50 and then moves to Step SP51.

In Step SP51, the main controller 20 reads out the reproduction list PL1 and the music-related information from the nonvolatile memory 21 and displays the reproduction list display image SC1 formed on the basis of the read out information on the display section 24, before it moves to the next step, or Step SP52.

In Step SP52, the main controller 20 waits for an operation by the user of depressing the replay button that is arranged in the operation input section 23 and, upon recognizing that the replay button is depressed, it moves to the next step, or Step SP53.

In Step SP53, the main controller 20 acquires the pulse of the user from the pulsimeter 30 by way of the external connection interface 22 and specifies the number of pulses as the value of the specified BPM. Then, it moves to the next step, or Step SP54.

In Step SP54, the main controller 20 determines when the specified value of the specified BPM agrees with the value of the ordinary BPM in the music-related information of the first piece of music on the reproduction list PL1 or not. When the answer to the question is affirmative, it means that both the specified value of the specified BPM and the value of the ordinary BPM in the music-related information of the first piece of music may be equal to "100". Then, the main controller 20 moves to Step SP55, where it reads out the compressed audio data of the first piece of music from the nonvolatile memory 21 and transmits it to the decoder section 25 and, at the same time, the ratio of the specified value of the specified BPM to the value of the ordinary BPM of the first piece of music (100/100) to the audio data processing section 26 so as to replay the first piece of music, controlling the reproduction speed of the compressed audio data of the first piece of music to make it agree with the ordinary reproduction speed. Then, the main controller 20 moves to the next step, or Step SP57.

When, on the other hand, the answer to the question is negative in Step SP54, it means that the specified value of the specified BPM may be "110" whereas the value of the ordinary BPM in the music-related information of the first piece of music may be "100". Then, the main controller 20 moves to Step SP56, where it reads out the compressed audio data of the first piece of music from the nonvolatile memory 21 and transmits it to the decoder section 25 and, at the same time, the ratio of the specified value of the specified BPM to the value of the ordinary BPM of the first piece of music (110/100) to the audio data processing section 26 so as to control the reproduction speed of the compressed audio data of the first piece of music to make it agree with 1.1 times of the ordinary reproduction speed before it moves to the next step, or Step SP57.

In Step SP57, the main controller 20 waits for the end of replaying the first piece of music and, when it recognizes that the replay of the piece of music ends, it moves to the next step of Step SP58. In Step SP58, the main controller 20 determines when the reproduction list PL1 includes the second piece of music to be replayed or not.

When the answer to the question is affirmative, it means that the reproduction list PL1 includes the second piece of music to be replayed. Then, the main controller 20 moves to Step SP59, where it prepares for replaying the second piece of music, and then it returns to Step SP53, where it acquires the pulse of the user from the pulsimeter 30 and specifies the acquired value for the specified BPM.

In this way, the main controller 20 repeats the processing steps from Step SP53 to Step SP58 for each piece of music until the answer to the question in Step SP58 becomes negative and hence until all the pieces of music on the reproduction list PL1 have been replayed. When all the pieces of music on the reproduction list PL1 have been replayed and the answer to the question in Step SP58 becomes negative, the main controller 20 moves to end step SP60 to end the reproduction process sequence RT5.

With the above-described sequence, the main controller 20 of the portable audio player 4 changes the specified BPMs of the pieces of music according to the pulse of the user and controls the reproduction speed of the compressed audio data of the pieces of music so as to make the tempo of the piece of music to be replayed agree with the pulse of the user.

Thus, with the recording/reproduction system 1 of the second embodiment, it is possible to replay a piece of music at a tempo that matches the pulse of the user who may be doing a physical exercise. Then, the user who is doing a physical exercise can listen to a piece of music at a tempo that does not disturb the pace of the exercise. Additionally, as the pulse of the user and the tempo of the piece of music the user is listening to are made to agree with each other, the user who is listening to the piece of music can enjoy an effect of relaxation.

(3) Third Embodiment

Now, the third embodiment of the invention will be described below in detail. The third embodiment is identical with the above-described first embodiment except that the portable audio player 4 specifies the value of the specified BPM of a piece of music by using the BPM table TB3 of the sequence of pieces of music it acquires from an external appliance connected to the external connection interface 22 at the time of replaying the piece of music. Therefore, the configuration of the user terminal 2 and the process sequence for recording that are the same as those of the first embodiment will not be described below any further.

(3-1) Configuration of Portable Audio Player

Figure 19:
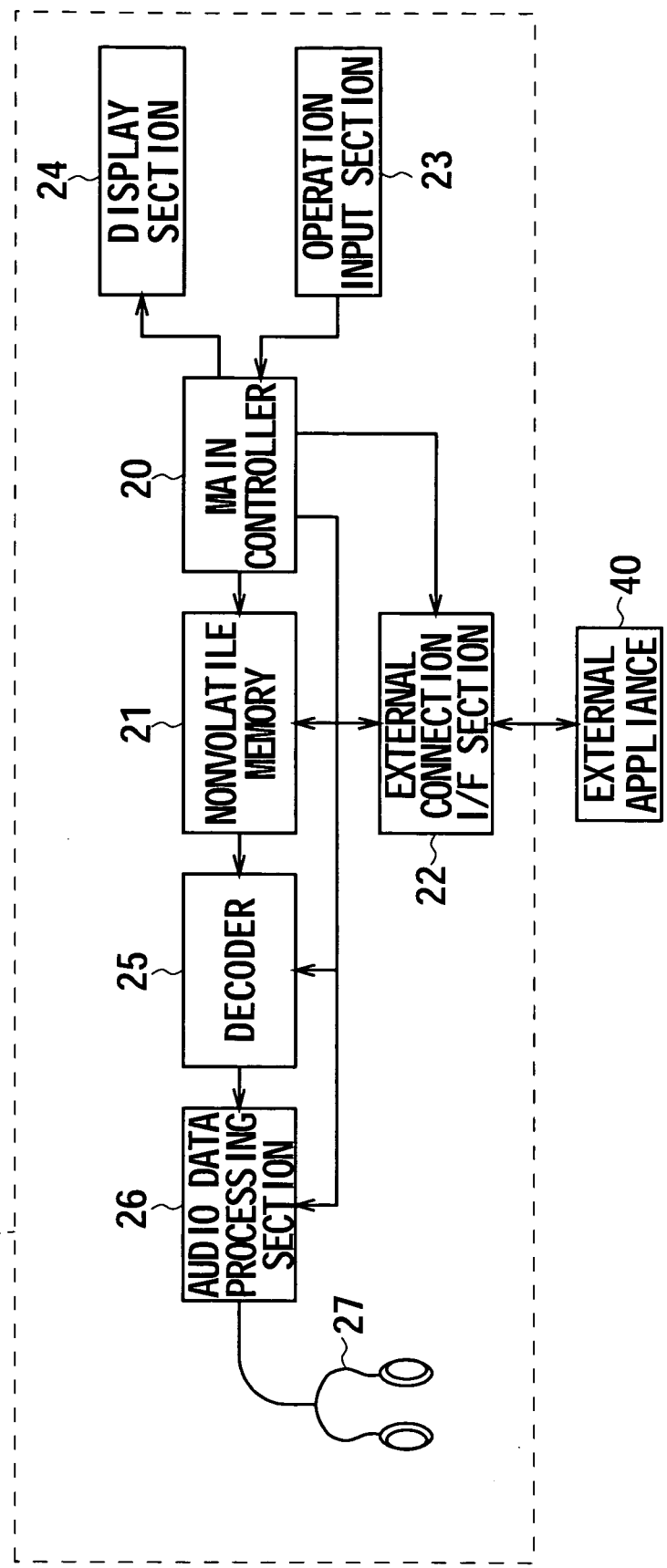
FIG. 19 is a schematic block diagram of a portable type audio player to which a third embodiment of the present invention can be applied.

Referring to FIG. 19, in which the components same as those of FIG. 8 are denoted respectively by the same reference symbols, the portable audio player 4 of the third embodiment records a reproduction list PL1 of the pieces of music received from the user terminal 2 by way of the external connection interface 22 in the nonvolatile memory 21 along with the compressed audio data and the music-related information of the pieces of music and thereafter, when it replays the pieces of music, it is taken away from the user terminal 2 and an external appliance 40 is connected to the external connection interface 22.

The external appliance 40 is typically a personal computer, which is adapted to prepare a BPM table TB3 of the sequence of pieces of music, where the sequence of replaying pieces of music and the corresponding respective values of the specified BPMs are associated with each other, on the basis of the number of pieces of music on the reproduction list PL1, the specified BPM range and the change function to be used as selected from the change functions f1 through f6 as in the case of the first embodiment and transmits the table TB3 to the portable audio player 4.

Thus, the main controller 20 of the portable audio player 4 transmits the number of pieces of music on the reproduction list PL1 to the external appliance 40 by way of the external connection interface 22. Then, it receives the BPM table TB3 of the sequence of pieces of music and stores it in the nonvolatile memory 21.

Upon receiving a command for replaying the pieces of music by way of the operation input section 23, the main controller 20 of the portable audio player 4 reads out the compressed audio data and the music-related information of the first piece of music on the reproduction list PL1 from the nonvolatile memory 21. Then, the main controller 20 sends out the compressed audio data it has read out to the decoder section 25 and also the ratio of the specified BPM (assumed to be "120" here as an example) to the ordinary BPM (assumed to be "100" here as an example) contained in the read out music-related information of the first piece of music (and hence 120/100 here) to audio data processing section 26.

The decoder section 25 obtains the audio data by executing a predetermined expansion-decoding process on the compressed audio data and sends it out to audio data processing section 26. The audio data processing section 26 controls the reproduction speed of the audio data according to the ratio of the specified BPM and the ordinary BPM (120/100) (1.2 times of the ordinary speed) by means of the digital pitch controller and executes a D/A conversion process on the audio data to obtain the corresponding audio signal so as to output the sounds that corresponds to the audio signal (and hence the piece of music) by way of an earphone 27.

The main controller 20 executes such a series of processes also on the compressed audio data of the second and subsequent pieces of music according to the reproduction list PL1.

In this way, the portable audio player 4 controls the reproduction speed of compressed audio data according to the ratio of the specified BPM specified in the table TB3 of the sequence of pieces of music obtained from the external appliance 40 to the corresponding ordinary BPM obtained as music-related information.

(3-2) Replay Process Sequence

Now, the process sequence for replaying pieces of music by utilizing the table TB3 of the sequence of pieces of music obtained from the external appliance 40 will be described in detail by referring to the flowchart of FIG. 20.

Figure 20:
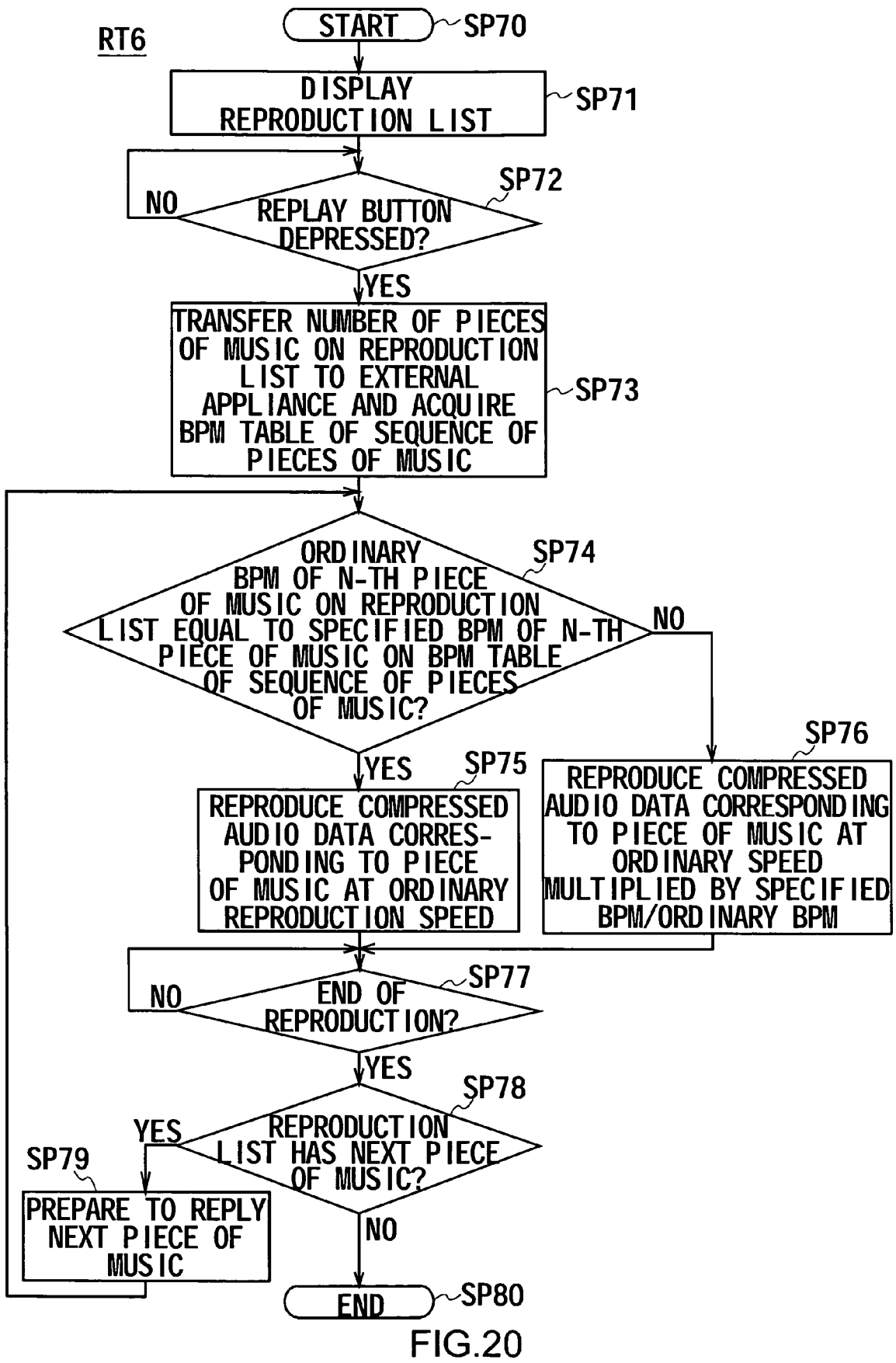
FIG. 20 is a flowchart of a music reproduction process sequence that can be used for the purpose of the third embodiment.
Figure 21:
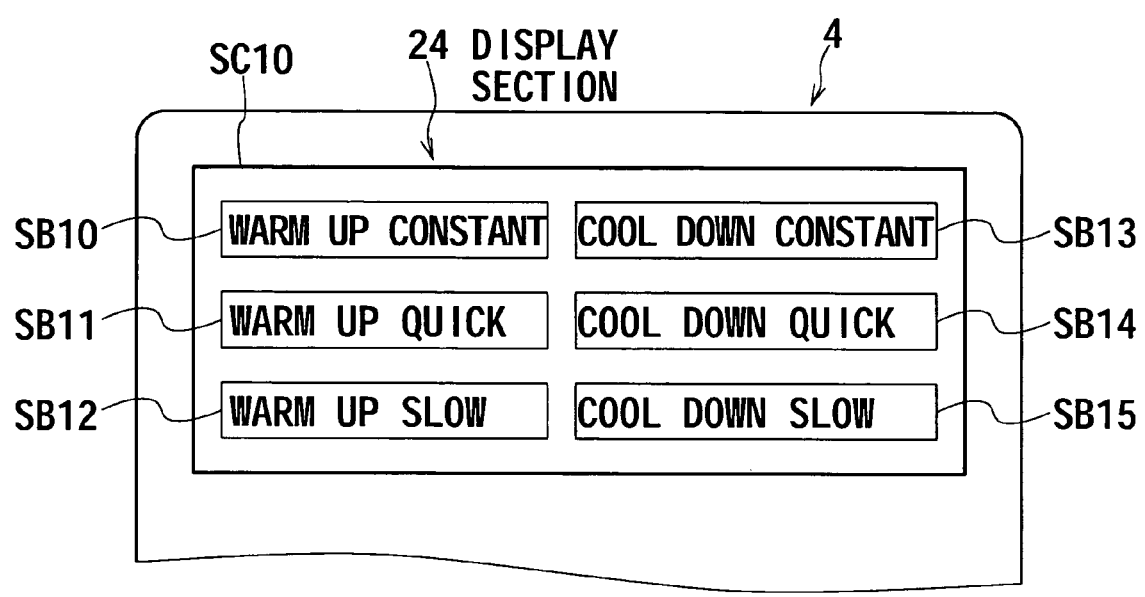
FIG. 21 is a schematic illustration of a display screen showing a combination selection image.

As shown in FIG. 20, as the user issues a command for displaying a reproduction list PL1 by way of the operation input section 23 in a state where the portable audio player 4 is taken away from the user terminal 2 and the external appliance 40 is connected to the user terminal 2, the main controller 20 of the portable audio player 4 starts the reproduction process sequence RT6 at start step SP70 and then moves to Step SP71.

In Step SP71, the main controller 20 reads out the reproduction list PL1 and the music-related information from the nonvolatile memory 21 and displays the reproduction list display image SC1 formed on the basis of the read out information on the display section 24, before it moves to the next step, or Step SP72.

In Step SP72, the main controller 20 waits for an operation by the user of depressing the replay button that is arranged in the operation input section 23 and, upon recognizing that the replay button is depressed, it moves to the next step, or Step SP73.

In Step SP73, the main controller 20 transmits the number of pieces of music on the reproduction list PL1 to the external appliance 40 by way of the external connection interface 22 and records the BPM table TB3 of the sequence of pieces of music transmitted from the external appliance 40 in return in the nonvolatile memory 21 before it moves to the next step, or Step SP74.

In Step SP74, the main controller 20 determines when the value of the specified BPM of the first piece of music on the BPM table TB3 of the sequence of pieces of music agrees with the value of the ordinary BPM of the first piece of music on the reproduction list PL1 or not. When the answer to the question is affirmative, it means that both the value of the specified BPM of the first piece of music on the BPM table TB3 of the sequence of pieces of music and the value of the ordinary BPM of the first piece of music on the reproduction list PL1 may be equal to "100". Then, the main controller 20 moves to Step SP75, where it reads out the compressed audio data of the first piece of music from the nonvolatile memory 21 and transmits it to the decoder section 25 and, at the same time, the ratio of the specified value of the specified BPM to the value of the ordinary BPM of the first piece of music (100/100) to the audio data processing section 26 so as to replay the first piece of music, controlling the reproduction speed of the compressed audio data of the first piece of music to make it agree with the ordinary reproduction speed. Then, the main controller 20 moves to the next step, or Step SP77.

When, on the other hand, the answer to the question is negative in Step SP74, it means that the value of the specified BPM of the first piece of music on the BPM table TB3 of the sequence of pieces of music may be "120" whereas the value of the ordinary BPM of the first piece of music may be "100". Then, the main controller 20 moves to Step SP76, where it reads out the compressed audio data of the first piece of music from the nonvolatile memory 21 and transmits it to the decoder section 25 and, at the same time, the ratio of the value of the specified BPM to the value of the ordinary BPM (120/100) to the audio data processing section 26 so as to control the reproduction speed of the compressed audio data of the first piece of music to make it agree with 1.2 times of the ordinary reproduction speed before it moves to the next step, or Step SP77.

In Step SP77, the main controller 20 waits for the end of replaying the first piece of music and, when it recognizes that the replay of the piece of music ends, it moves to the next step of Step SP78. In Step SP78, the main controller 20 determines when the reproduction list PL1 includes the second piece of music to be replayed or not.

When the answer to the question is affirmative, it means that the reproduction list PL1 includes the second piece of music to be replayed. Then, the main controller 20 moves to Step SP79, where it prepares for replaying the second piece of music, and then it returns to Step SP74.

In this way, the main controller 20 repeats the processing steps from Step SP74 to Step SP78 for each piece of music until the answer to the question in Step SP78 becomes negative and hence until all the pieces of music on the reproduction list PL1 have been replayed. When all the pieces of music on the reproduction list PL1 have been replayed and the answer to the question in Step SP78 becomes negative, the main controller 20 moves to end step SP80 to end the reproduction process sequence RT6.

With the above-described sequence, the main controller 20 of the portable audio player 4 changes the specified BPMs of the compressed audio data of the pieces of music according to the table TB3 of the sequence of pieces of music obtained from the external appliance 40 and controls the reproduction speed of the compressed audio data of the pieces of music according to the ratio of the specified BPM to the ordinary BPM so as to make the tempo of the piece of music to be replayed agree with the one defined by the external appliance 40.

Thus, with the recording/reproduction system 1 of the third embodiment, the external appliance 40 can control the tempo of the piece of music to be replayed by the portable audio player 4. Then, for example, it is possible to replay a piece of music at a tempo that is interlocked with any of various operations of the external appliance 40. For example, if the a fitness machine is equipped with the functional feature of the external appliance 40, it is possible to reply a piece of music at a tempo that matches the fitness program of the fitness machine.

Additionally, since the external appliance 40 is adapted to execute arithmetic processes for specifying specified BPMs of pieces of music by means of any of the change functions f1 through f6 and the portable audio player 4 is adapted to control the reproduction speed of reproducing the compressed audio data of each of the pieces of music according to the BPM table TB3 of the sequence of pieces of music obtained as a result, it is possible to eliminate the function of executing arithmetic processes for specifying specified BPMs from the main controller 20, for example, to make it possible to design a portable audio player 4 having a very simplified configuration.

(4) Other Embodiments

While the user is prompted to select one of the combinations of ranges of specified BPMs for replaying pieces of music and change functions f1 through f6 by way of the operation input section 23 in the above description of the first embodiment, it may alternatively be so arranged that selection buttons including selection button SB10 for the combination of the range of specified BPM of "100≦specified BPM≦130" and the change function of f1, selection button SB11 for the combination of the range of specified BPM of "100≦specified BPM≦130" and the change function of f2, selection button SB12 for the combination of the range of specified BPM of "100≦specified BPM≦130" and the change function of f3, selection button SB13 for the combination of the range of specified BPM of "100≦specified BPM≦130" and the change function of f4, selection button SB14 for the combination of the range of specified BPM of "100≦specified BPM≦130" and the change function of f5 and selection button SB15 for the combination of the range of specified BPM of "100≦specified BPM≦130" and the change function of f6 are provided and additionally character messages "warm up—constant", "warm up—quick", "warm up—slow, "cool down—constant", "cool down—quick" and "cool down—slow" are displayed respectively on the selection buttons SB10, SB11, SB12, SB13, SB14 and SB15 in a combination selection image SC10 that is displayed on the display section 24 so that the main controller 20 of the portable audio player 4 prompts the user to select one of the combinations of the specified BPMs for replaying pieces of music and the change functions f1 through f6 by means of the selection buttons SB10 through SB15 on the combination selection image SC10.

With this arrangement, the user can more intuitively imagine how the tempos of pieces of music are actually different when he or she is prompted to select one of the combinations of the specified BPMs for replaying pieces of music and the change functions f1 through f6.

While the present invention is applied to a recording/reproduction system 1 including a user terminal 2 that operates as recording apparatus for recording pieces of music and a portable audio player 4 that operates as reproduction apparatus for replaying pieces of music in the above description of embodiments, the present invention is by no means limited thereto and may also be applied to a recording/reproduction system 1 including only a portable audio player 4 that operates both as recording apparatus and reproduction apparatus and a recording/reproduction system 1 including only a user terminal 2 that operates both as recording apparatus and reproduction apparatus.

When the user terminal 2 is adapted to operate as reproduction apparatus to take over the role of the portable audio player 4, the decoder section 25 and the audio data processing section 26 of the portable audio player 4 shown in FIG. 8 are connected to the bus 13 of the user terminal 2 shown in FIG. 7 and, at the same time, the control section 10 of the user terminal 2 is made to take the role of the main controller 20 of the portable audio player 4 while the hard disk drive 12 of the user terminal 2 is made to take the role of the nonvolatile memory 21 of the portable audio player 4.

When, on the other hand, the portable audio player 4 is adapted to operate as recording apparatus to take over the role of the user terminal 2, the network interface section 19 is connected to the main controller 20 of the portable audio player 4 and made to take the role of the control section 10 of the user terminal 2. With this arrangement, the CD drive is connected to the external connection interface section 22 of the portable audio player 4 so that music data may be read out from the music CD loaded in the CD drive and stored in the nonvolatile memory 21 or down loaded from a contents server on the network NT and stored in the nonvolatile memory 21.

While the above-described embodiments are adapted to control the reproduction speed of audio data of pieces of music in order to use different tempos for pieces of music, the present invention is by no means limited thereto and it is possible to control the reproduction speed of video data or some other data according to one embodiment of the present invention. To control the reproduction speed of video data, the Frames Per Second (FPS: the number of still images displayed in a second) that is specified in advance to show the reproduction speed of video data is used instead of the ordinary BPM. Then, video data can be reproduced at a desired reproduction speed like audio data in a manner as described above for the embodiments.

While the audio data read out from a music CD 3 are compression-coded and stored in the hard disk drive 12 when recording pieces of music at the user terminal 2 in the above-described embodiments, the present invention is by no means limited thereto and audio data may alternatively be stored in the hard disk drive 12 without compression-coding. Additionally, the user terminal 2 may be used to store not only the audio data read out from a music CD 3 but also the music data downloaded from a contents server on the network NT by way of the network interface section 19, in the hard disk drive 12.

While an ordinary BPM is used as speed information showing the reproduction speed specified in the compressed audio data (the first reproduction speed) of a piece of music and a specified BPM is used as speed change information showing that the reproduction speed is changed to a desired reproduction speed (the second reproduction speed) in the above description of the embodiments, the present invention is by no means limited thereto and information other than BPMs may be used to show the reproduction speed of data for the purpose of the present invention.

While the user is prompted to specify a range of ordinary BPMs when preparing a reproduction list PL1 in the above-described embodiments, the present invention is by no means limited thereto and it may alternatively be so arranged that the user is prompted to specify a value for ordinary BPMs and pieces of music having respective BPMs whose values agree with the specified value are added to the reproduction list PL1 to update the reproduction list PL1. With this arrangement, it is possible to prepare a reproduction list PL1 showing pieces of music whose tempos perfectly agree with each other.

The tempos of pieces of music are made to be different and gradually increased or decreased by changing the reproduction speed of the compressed audio data of the pieces of music according to the selected one of the change functions f1 through f6 in the above-described embodiments, the present invention is by no means limited thereto and the tempo of each piece of music may be changed after the elapse of a predetermined number of seconds regardless of the sequence of pieces of music. With this arrangement, each piece of music will be divided by the predetermined number of seconds and a specified BPM will be specified for each time period of the predetermined number of seconds according to the selected one of the change functions f1 through f6 so as to change the tempo of each piece of music after the elapse of a predetermined number of seconds. A function other than the change functions f1 through f6 may be used.

While in the above-described embodiments, a portable audio player 4 is adapted to reply pieces of music according to one reproduction list PL1, the present invention is by no means limited thereto and the present invention may also be applied to a user terminal 2 adapted to prepare a plurality of reproduction lists and transfer them to the portable audio player 4, and then a user is prompted to select a desired reproduction list from the plurality of reproduction lists on the portable audio player 4 so as to reply a piece of music according to the selected reproduction list.

While in the above-described embodiments, a portable audio player 4 is adapted to store audio data in a nonvolatile memory 21 in each of the above-described embodiments, the present invention is by no means limited thereto and the present invention may also be applied to a portable audio player 4 adapted to store audio data in a hard disk drive.

While in the above-described embodiments, the portable audio player 4 is adapted to execute a constant BPM reproduction process or a variable BPM reproduction process on the pieces of music on the reproduction list PL1, the present invention is by no means limited thereto and it may alternatively be so arranged that, when one or more than one pieces of music other than those on the reproduction list PL1 are stored in the nonvolatile memory 21 of the portable audio player 4, the portable audio player 4 executes a constant BPM reproduction process or a variable BPM reproduction process on all the pieces of music stored in the nonvolatile memory 21. Still alternatively, it may be so arranged that the portable audio player 4 executes a constant BPM reproduction process or a variable BPM reproduction process on the one or more than one pieces of music that are retrieved under a certain condition of retrieval defined by using music-related information such as pieces of music of the same genre or of the same album title.

While the user terminal 2 that operates as data processing apparatus according to the invention is made to include a hard disk drive 12 that operates as memory section for storing compressed audio data as data and ordinary BPMs as speed information in association with each other, a control section 10 that operates as reproduction control information generating section for generating reproduction lists PL1 as reproduction control information and an external connection interface section 18 that operates as communication section for transmitting reproduction lists PL1 to the portable audio player 4 in the above-described embodiments, the present invention is by no means limited thereto and a user terminal 2 having a different configuration may alternatively be used for the purpose of the present invention so long as it operates substantially the same as the above-described user terminal 2.

While the portable audio player 4 is made to include a nonvolatile memory 21 that operates as memory section, a main controller 20 that operates as reproduction control information generating section for generating specified BPMs as reproduction control information and variable speed information, a decoder section 25 and an audio data processing section 26, the decoder section 25 and the audio data processing section 26 operating as reproduction section, so as to operate as data processing apparatus according to one embodiment of the invention and also include an external connection interface section 22 that operates as communication section for receiving reproduction lists PL1 from the user terminal 2 as reproduction control information along with decoder section 25 and the audio data processing section 26 that operate as reproduction section, so as to operate as data reproduction apparatus according to the present invention in the above-described embodiments, the present invention is by no means limited thereto and a portable audio player 4 having a different configuration may alternatively be used for the purpose of the present invention so long as it operates substantially the same as the above-described portable audio player 4.

It should be understood by those skilled in the art that various modifications, combinations, sub-combinations and alterations may occur depending on design requirements and other factors insofar answer they are within the scope of the appended claims or the equivalents thereof.

What is claimed is:

1. A data processing apparatus comprising:
   a memory section to store at least two pieces of audio data and speed information corresponding to the at least two pieces of audio data, wherein the speed information comprises a first reproduction speed for each of the at least two pieces of audio data;
   a display section to display a list of each of the at least two pieces of audio data selected to be reproduced by the data processing apparatus;
   an input section to receive, prior to initiating reproduction of any of the at least two pieces of audio data, for each piece of audio data in the list, a user-specified second reproduction speed specific to that piece of audio data, the user-specified second reproduction speed for each piece of audio data being different than the user-specified second reproduction speed for each other piece of audio data; and
   a reproduction control information generating section to generate reproduction control information for controlling the reproduction of each piece of audio data in the list, wherein the reproduction control information comprises variable speed information usable to reproduce each piece of audio data in the list at its corresponding second reproduction speed.

2. The apparatus according to claim 1, further comprising:
   a reproduction section to control the reproduction of each piece of audio data in the list, according to the reproduction control information generated by the reproduction control information generating section.

3. The apparatus according to claim 2, wherein the reproduction section reproduces each piece of audio data in the list at a reproduction speed that is a function of the ratio of the first reproduction speed included in the speed information and the second reproduction speed.

4. The apparatus according to claim 1, further comprising:
   a communication section to transmit the reproduction control information generated by the reproduction control information generating section to an external data reproduction apparatus along with each piece of audio data in the list.

5. The data processing apparatus of claim 1, wherein each of the at least two pieces of audio data is a song.

6. The data processing apparatus of claim 1, wherein the input section is configured to receive, for each piece of audio data in the list, the user-specified second reproduction speed specific to that piece of audio data as a numeric value indicative of a desired tempo, in beats per minute, at which that audio data is to be reproduced.

7. The data processing apparatus of claim 1, wherein the input section is configured to receive the user-specified second reproduction speed for each piece of audio data in the list as a separate input for each piece of audio data in the list.

8. The data processing apparatus of claim 1, wherein the user-specified second reproduction speed does not affect the reproduction speed of pieces of audio data other than the piece of audio data for which it was specified.

9. The data processing apparatus of claim 1, wherein the input section is configured to receive input relating to a change function defining a change from a user-specified second reproduction speed for one piece of audio data in the list to a user-specified second reproduction speed for another piece of audio data in the list.

10. A data processing method comprising:
    storing at least two pieces of audio data and speed information corresponding to the at least two pieces of audio data, wherein the speed information comprises a first reproduction speed for each of the at least two pieces of audio data;
    displaying a list of each of the at least two pieces of audio data selected to be reproduced by the data processing apparatus;
    receiving prior to initiating reproduction of any of the at least two pieces of audio data, for each piece of audio data in the list, user input specifying a second reproduction speed specific to that piece of audio data, the second reproduction speed for each piece of audio data being different than the second reproduction speed for each other piece of audio data; and
    generating reproduction control information for controlling the reproduction of each piece of audio data in the list, wherein the reproduction control information comprises variable speed information usable to reproduce each piece of audio data in the list at its corresponding second reproduction speed.

11. The method according to claim 10, further comprising:
controlling the reproduction of the at least two pieces of audio data according to the reproduction control information generated in the reproduction control information generating step.

12. A data processing method of claim 10, wherein each of the at least two pieces of audio data is a song.

13. A computer readable medium having encoded thereon a data processing program that, when executed by a data processing apparatus, performs a method comprising:
storing at least two pieces of audio data and speed information corresponding to the at least two pieces of audio data, wherein the speed information comprises a first reproduction speed for each of the at least two pieces of audio data;
displaying a list of each of the at least two pieces of audio data selected to be reproduced by the data processing apparatus;
receiving prior to initiating reproduction of any of the at least two pieces of audio data, for each piece of audio data in the list, user input specifying a second reproduction speed specific to that piece of audio data, the second reproduction speed for each piece of audio data being different than the second reproduction speed for each other piece of audio data; and
generating reproduction control information for controlling the reproduction of each piece of audio data in the list, wherein the reproduction control information comprises variable speed information usable to reproduce each piece of audio data in the list at its corresponding second reproduction speed.

14. A data processing program of claim 13, wherein each of the at least two pieces of audio data is a song.

* * * * *